(12) United States Patent
Li et al.

(10) Patent No.: US 12,166,551 B2
(45) Date of Patent: Dec. 10, 2024

(54) CHANNEL STATE INFORMATION TRANSMISSION METHOD AND APPARATUS

(71) Applicant: HUAWEI TECHNOLOGIES CO., LTD., Guangdong (CN)

(72) Inventors: Xueru Li, Beijing (CN); Jianqin Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 366 days.

(21) Appl. No.: 17/581,052

(22) Filed: Jan. 21, 2022

(65) Prior Publication Data

US 2022/0149911 A1 May 12, 2022

Related U.S. Application Data

(63) Continuation of application No. PCT/CN2020/103364, filed on Jul. 21, 2020.

(30) Foreign Application Priority Data

Jul. 22, 2019 (CN) .......................... 201910662119.8

(51) Int. Cl.
*H04B 7/06* (2006.01)
*H04L 5/00* (2006.01)
*H04W 74/0833* (2024.01)

(52) U.S. Cl.
CPC ......... *H04B 7/0626* (2013.01); *H04L 5/0053* (2013.01); *H04W 74/0833* (2013.01)

(58) Field of Classification Search
CPC ... H04L 5/0053; H04L 5/0057; H04L 5/0048; H04L 5/0094; H04L 1/0027;
(Continued)

(56) References Cited

U.S. PATENT DOCUMENTS

2017/0353976 A1 12/2017 Yerramalli et al.
2018/0279136 A1 9/2018 Tsai et al.
(Continued)

FOREIGN PATENT DOCUMENTS

CN 104186020 A 12/2014
CN 108289016 A 7/2018
(Continued)

OTHER PUBLICATIONS

Motorola Mobility, "CSI measurement and reporting for LAA," 3GPP TSG RAN WG1#82bis, R1-155780, Malmo, Sweden, Oct. 5-9, 2015, 3 pages.
(Continued)

*Primary Examiner* — Jianye Wu
(74) *Attorney, Agent, or Firm* — Fish & Richardson P.C.

(57) ABSTRACT

A network device sends K reference signal resources, where K is an integer greater than 0. The network device receives a first random access preamble in a first random access time-frequency resource unit. The network device determines indexes of S reference signal resources and first channel state information CSI of the S reference signal resources based on the first random access preamble and the first random access time-frequency resource unit the S reference signal resources are reference signal resources in the K reference signal resources, and S is an integer greater than 0 and less than or equal to K.

20 Claims, 12 Drawing Sheets

(58) Field of Classification Search
CPC ........... H04W 74/0833; H04W 74/004; H04W 74/0866; H04W 72/20
See application file for complete search history.

(56) References Cited

U.S. PATENT DOCUMENTS

| | | | | |
|---|---|---|---|---|
| 2018/0324853 | A1* | 11/2018 | Jeon | H04W 52/04 |
| 2019/0208436 | A1* | 7/2019 | Zhou | H04B 7/088 |

FOREIGN PATENT DOCUMENTS

| | | |
|---|---|---|
| CN | 108810918 A | 11/2018 |
| CN | 109076556 A | 12/2018 |
| CN | 109802801 A | 5/2019 |
| EP | 3500014 A1 | 6/2019 |
| WO | 2016072784 A1 | 5/2016 |

OTHER PUBLICATIONS

Motorola Mobility, "CSI measurement and reporting for LAA," 3GPP TSG RAN WG1#82, R1-154590, Beijing, China, Aug. 24-28, 2015, 3 pages.
Office Action issued in Chinese Application No. 201910662119.8 on Mar. 28, 2022, 4 pages.
Intel Corporation, "Remaining issues in NR RACH procedures," 3GPP TSG RAN WG1 Meeting #93, R1-1806501, Busan, Korea, May 21-25, 2018, 7 pages.
Office Action issued in Chinese Application No. 201910662119.8 on Jun. 28, 2021, 14 pages (with English translation).
OPPO, "Text Proposal for Beam Failure Recovery," 3GPP TSG RAN WG1 Meeting AH 1801, R1-1800499, Vancouver, Canada, Jan. 22-26, 2018, 4 pages.
PCT International Search Report and Written Opinion issued in International Application No. PCT/CN2020/103364 on Oct. 28, 2020, 15 pages (with English translation).
Extended European Search Report issued in European Application No. 20845009.8 on Aug. 9, 2022, 11 pages.
Qualcomm Incorporated, "Procedures for Two-Step RACH," 3GPP TSG-RAN WG1 Meeting #97, R1-1907256, Reno, USA, May 13-17, 2019, 14 pages.

* cited by examiner

CHANNEL STATE INFORMATION TRANSMISSION METHOD AND APPARATUS

CROSS-REFERENCE TO RELATED APPLICATIONS

This application is a continuation of International Application No. PCT/CN2020/103364, filed on Jul. 21, 2020, which claims priority to Chinese Patent Application No. 201910662119.8, filed on Jul. 22, 2019. The disclosures of the aforementioned applications are hereby incorporated by reference in their entireties.

TECHNICAL FIELD

This application relates to the field of communication technologies, and in particular, to a channel state information transmission method and apparatus.

BACKGROUND

In an existing mobile communication system, to improve reliability and transmission efficiency of downlink data transmission, a base station needs to determine a modulation scheme, a channel coding code rate, and the like of downlink data based on channel state information (channel state information, CSI) reported by a terminal device. The CSI is determined by the terminal device based on a downlink reference signal sent by the base station, and the CSI may reflect quality of a downlink channel.

Currently, a CSI reporting process is implemented after a radio resource control (radio resource control, RRC) connection is successfully established between the base station and the terminal device. However, before the terminal device reports the CSI, the base station delivers some system information or higher layer signaling to the terminal device through a physical downlink shared channel (Physical Downlink Shared Channel, PDSCH). In this case, for transmission robustness, when sending the PDSCH, the base station can perform transmission only by using a low channel coding code rate and a low modulation scheme. As a result, transmission efficiency of the PDSCH is very low.

In conclusion, a problem of how the terminal device reports the CSI to the base station as soon as possible to improve downlink data transmission efficiency is to be resolved urgently.

SUMMARY

Embodiments of this application provide a channel state information transmission method and apparatus, to resolve a problem of how a terminal device reports CSI to a base station as soon as possible to improve downlink data transmission efficiency.

According to a first aspect, an embodiment of this application provides a channel state information transmission method. The method includes: A network device sends K reference signal resources, where K is an integer greater than 0. The network device receives a first random access preamble in a first random access time-frequency resource unit. The network device determines indexes of S reference signal resources and first channel state information CSI of the S reference signal resources based on the first random access preamble and the first random access time-frequency resource unit, where
the S reference signal resources are associated with at least one of the first random access time-frequency resource unit and the first random access preamble, the first CSI is associated with at least one of the first random access time-frequency resource unit and the first random access preamble, the S reference signal resources are reference signal resources in the K reference signal resources, and S is an integer greater than 0 and less than or equal to K.

In the foregoing method, the first random access time-frequency resource unit and the first random access preamble are separately associated with the first CSI. Therefore, after receiving the first random access preamble by using the first random access time-frequency resource unit, the network device may determine the first CSI. In this method, the network device may obtain the first CSI when obtaining the first random access preamble. When obtaining the first CSI, the network device may determine, based on the first CSI, a channel coding code rate and a modulation scheme that are used when the network device communicates with a terminal device, to avoid a case in which when the first CSI is not determined, transmission efficiency is reduced because only a lowest channel coding code rate and a lowest modulation scheme are used to perform downlink transmission, thereby improving data transmission efficiency.

In a possible implementation, that the network device determines indexes of S reference signal resources and first channel state information CSI of the S reference signal resources based on the first random access preamble and the first random access time-frequency resource unit includes:

The network device determines, based on a first association relationship and a second association relationship, the S reference signal resources, the network device, and the first CSI that are associated with the first random access time-frequency resource unit and the first random access preamble, where the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:

first information, where the first information is used to indicate a quantity Z of random access time-frequency resource units in a same time unit;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

X*1/Y≥L*Q, and X*max{Y, 1}≤N, where max{ } is an operation of obtaining a maximum value.

In a possible implementation, the third information, fourth information, and the fifth information meet the following constraint condition:

$$X = LQ \text{ or } X = \begin{cases} LQY, Y \le 1 \\ LQ, Y > 1 \end{cases}.$$

In a possible implementation, all or a part of information about the first association relationship is sent by the network device by using a broadcast message or a multicast message. Optionally, the network sends all or a part of the information about the first association relationship by using a system information block 1 SIB 1.

In a possible implementation, the K reference signal resources are associated with R random access time-frequency resource units, CSI of one of the K reference signal resources has Q values, and the K reference signal resources are associated with N random access preambles; and the second association relationship includes at least one of the following:

the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;

when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

According to a second aspect, this application provides a communication apparatus. The communication apparatus has a function of implementing the network device in the foregoing embodiments. The function may be implemented by hardware, or may be implemented by hardware executing corresponding software. The hardware or the software includes one or more units or units corresponding to the function.

In a possible implementation, the communication apparatus includes a processor, and the processor is configured to support the communication apparatus in performing a corresponding function of the network device in the foregoing communication methods. The communication apparatus further includes a memory, and the memory may be coupled to the processor, and stores program instructions and data that are necessary for the communication apparatus. Optionally, the communication apparatus further includes a transceiver, and the transceiver is configured to support communication between the communication apparatus and a terminal device or the like. The transceiver may be an independent receiver, an independent transmitter, a transceiver having both a sending function and a receiving function, or an interface circuit.

In a possible implementation, the communication apparatus may be a network device, or a component, for example, a chip, a chip system, or a circuit, that can be used in the network device.

According to a third aspect, this application provides a communication apparatus, configured to implement the method according to any one of the first aspect or the possible implementations of the first aspect, or configured to implement the method according to any one of the second aspect or the possible implementations of the second aspect. The communication apparatus includes corresponding functional units, for example, a processing unit and a transceiver unit, respectively configured to implement steps in the foregoing methods. A function may be implemented by hardware, or may be implemented by hardware executing corresponding software. The hardware or the software includes one or more units corresponding to the function.

In a possible implementation, a structure of the communication apparatus includes a processing unit and a transceiver unit. The units may perform corresponding functions in the foregoing method examples. For details, refer to detailed descriptions in the method examples. Details are not described herein.

According to a fourth aspect, this application provides a channel state information transmission method. The method includes: A terminal device receives K reference signal resources, where K is an integer greater than 0. The terminal device determines S reference signal resources in the K reference signal resources, and determines first CSI of the S reference signal resources, where S is an integer greater than 0 and less than or equal to K. The terminal device sends a first random access preamble in a first random access time-frequency resource unit, where at least one of the first random access time-frequency resource unit and the first random access preamble is associated with the S reference signal resources, at least one of the first random access time-frequency resource unit and the first random access preamble is associated with the first CSI of the S reference signal resources, and S is an integer greater than 0 and less than or equal to K.

In the foregoing method, the first random access time-frequency resource unit and the first random access preamble are separately associated with the first CSI. Therefore, after the terminal device sends the first random access preamble by using the first random access time-frequency resource unit, a network device may obtain the first CSI when obtaining the first random access preamble. When obtaining the first CSI, the network device may determine, based on the first CSI, a channel coding code rate and a modulation scheme that are used when the network device communicates with the terminal device, to avoid a case in which when the first CSI is not determined, transmission efficiency is reduced because only a lowest channel coding code rate and a lowest modulation scheme are used to perform downlink transmission, thereby improving data transmission efficiency.

In a possible implementation, the terminal device determines, based on a first association relationship and a second association relationship, the first random access time-frequency resource unit and the first random access preamble that are associated with the S reference signal resources and the first CSI, where the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:

first information, where the first information is used to indicate a quantity Z of random access time-frequency resource units in a same time unit;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

$X*1/Y \geq L*Q$, and $X*\max\{Y, 1\} \leq N$, where $\max\{\ \}$ is an operation of obtaining a maximum value.

In a possible implementation, the third information, the fourth information, and the fifth information meet the following constraint condition:

$X = LQ$ or $$X = \begin{cases} LQY, Y \leq 1 \\ LQ, Y > 1 \end{cases}.$$

In a possible implementation, all or a part of information about the first association relationship is sent by the network device by using a broadcast message or a multicast message. Optionally, the network sends all or a part of the information about the first association relationship by using a system information block 1 SIB 1.

In a possible implementation, the K reference signal resources are associated with R random access time-frequency resource units, CSI of one of the K reference signal resources has Q values, and the K reference signal resources are associated with N random access preambles; and the second association relationship includes at least one of the following:

the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;

when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

According to a fifth aspect, this application provides a communication apparatus. The communication apparatus has a function of implementing the terminal device in the foregoing embodiments. The function may be implemented by hardware, or may be implemented by hardware executing corresponding software. The hardware or the software includes one or more units or units corresponding to the function.

In a possible implementation, the communication apparatus includes a processor, and the processor is configured to support the communication apparatus in performing a corresponding function of the terminal device in the foregoing communication methods. The communication apparatus further includes a memory, and the memory may be coupled to the processor, and stores program instructions and data that are necessary for the communication apparatus. Optionally, the communication apparatus further includes a transceiver, and the transceiver is configured to support communication between the communication apparatus and a network device or the like. The transceiver may be an independent receiver, an independent transmitter, a transceiver having both a sending function and a receiving function, or an interface circuit.

In a possible implementation, the communication apparatus may be a terminal device, or a component, for example, a chip, a chip system, or a circuit, that can be used in the terminal device.

According to a sixth aspect, this application provides a communication apparatus, configured to implement the method according to any one of the first aspect or the possible implementations of the first aspect, or configured to implement the method according to any one of the second aspect or the possible implementations of the second aspect. The communication apparatus includes corresponding functional units, respectively configured to implement steps in the foregoing methods. A function may be implemented by hardware, or may be implemented by hardware executing corresponding software. The hardware or the software includes one or more units corresponding to the function.

In a possible implementation, a structure of the communication apparatus includes a processing unit and a transceiver unit. The units may perform corresponding functions in the foregoing method examples. For details, refer to detailed descriptions in the method examples. Details are not described herein.

According to a seventh aspect, an embodiment of this application provides a communication system. The communication system includes a terminal device and a network device. The terminal device may be configured to perform the method according to any one of the first aspect or the possible implementations of the first aspect, and the network device may be configured to perform the method according to any one of the second aspect or the possible implementations of the second aspect.

According to an eighth aspect, an embodiment of this application provides a computer-readable storage medium. The computer storage medium stores computer-readable instructions. When a computer reads and executes the computer-readable instructions, the computer is enabled to perform the method in any one the possible designs.

According to a ninth aspect, an embodiment of this application provides a computer program product. When a computer reads and executes the computer program product, the computer is enabled to perform the method in any one of the possible designs.

According to a tenth aspect, an embodiment of this application provides a chip. The chip is connected to a memory, and is configured to read and execute a software program stored in the memory, to implement the method in any one of the possible designs.

DESCRIPTION OF EMBODIMENTS

The following describes embodiments of this application in detail with reference to the accompanying drawings of this specification.

The embodiments of this application may be applied to various mobile communication systems, for example, a new radio (new radio, NR) system, a long term evolution (long term evolution, LTE) system, a long term evolution-advanced (advanced long term evolution, LTE-A) system, a universal mobile telecommunication system (universal mobile telecommunication system, UMTS), an evolved long term evolution (evolved long term evolution, eLTE) system, a future communication system, and another communication system. Specifically, this is not limited herein.

Figure 1:
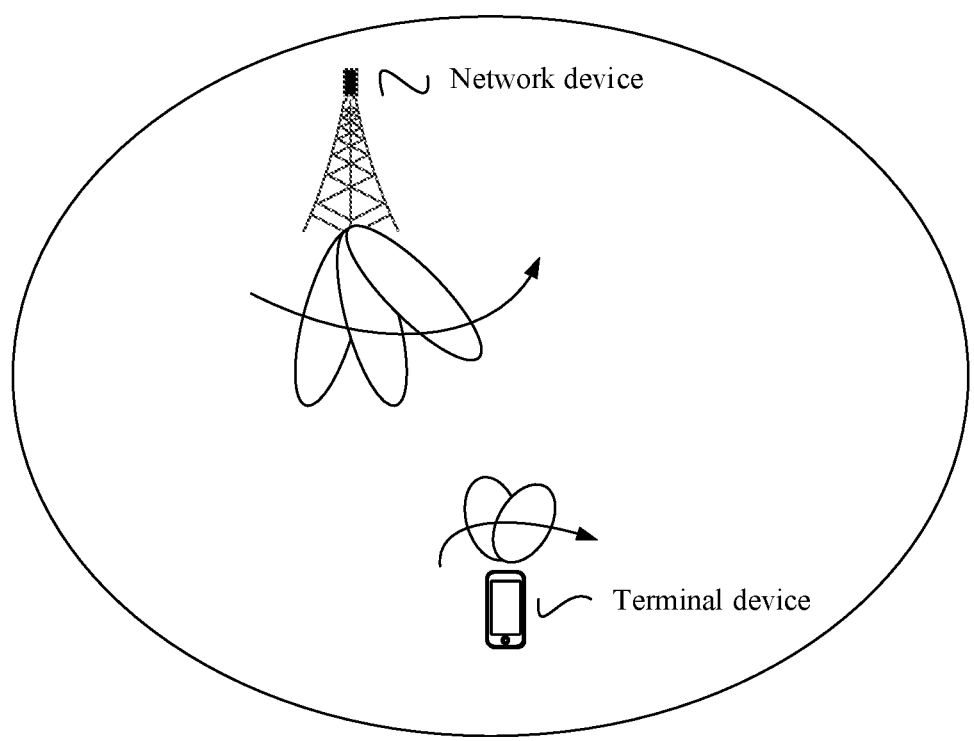
FIG. 1 is a schematic flowchart of a channel state information transmission method according to an embodiment of this application.

For ease of understanding the embodiments of this application, a communication system shown in FIG. 1 is first used as an example to describe in detail a communication system applicable to the embodiments of this application. FIG. 1 is a schematic diagram of the communication system applicable to a communication method in the embodiments of this application. As shown in FIG. 1, the communication system includes a network device and a terminal device. The network device may have a plurality of antennas, and the terminal device may also have a plurality of antennas. The network device sends a plurality of reference signal resources by using different transmit beams, and different transmit beams are determined based on different transmit weighting coefficients. The reference signal resource may be a synchronization signal block (synchronizing signal block, SSB). When receiving a reference signal resource in a beam, the terminal device performs channel measurement based on the reference signal resource to obtain CSI of the reference signal resource.

In the embodiments of this application, an association relationship between a reference signal resource and a random access time-frequency resource unit and/or a random access preamble, and an association relationship between CSI and a random access time-frequency resource unit and/or a random access preamble may be pre-established. When the terminal device performs random access, the terminal device may determine a reference signal resource with high channel quality and CSI of the reference signal resource by measuring reference signal resources in a plurality of beams, select a random access preamble that is associated with the CSI and/or the reference signal resource, and send the random access preamble to the network device by using a random access time-frequency resource unit that is associated with the CSI and/or the reference signal resource. In this implicit reporting method, the terminal device reports the selected reference signal resource and the CSI to the network device. When receiving, in a random access time-frequency resource unit, the random access preamble sent by the terminal device, the network device may determine, with reference to the foregoing association relationship, the reference signal resource selected by the terminal device and the CSI of the reference signal resource, and determine a transmit beam and a modulation and coding scheme that should be used when the terminal device sends a system message and/or dedicated (dedicated) RRC signaling, to improve transmission efficiency of the system message and/or the dedicated RRC signaling. Details are described in the following.

In the embodiments of this application, the terminal device may be a device having a wireless transceiver function or a chip that can be disposed in the device. The device having the wireless transceiver function may also be referred to as user equipment (user equipment, UE), an access terminal, a subscriber unit, a subscriber station, a mobile station, a remote station, a remote terminal, a mobile device, a user terminal, a user agent, or a user apparatus. In actual application, the terminal device in the embodiments of this application may be a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the device with the wireless transceiver function and the chip that can be disposed in the device are collectively referred to as the terminal device.

In the embodiments of this application, the network side device may be a radio access device in various standards, for example, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, or a transmission point (transmission and reception point, TRP or transmission point, TP). The network side device may alternatively be a gNB or a transmission point (TRP or TP) in a 5G (NR) system, one or a group of antenna panels (including a plurality of antenna panels) of a base station in a 5G system, a network node that constitutes a gNB or a transmission point, for example, a baseband unit (BBU), a DU in a central-distributed (central unit-distributed, CU-DU) architecture, or the like.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Figure 2:
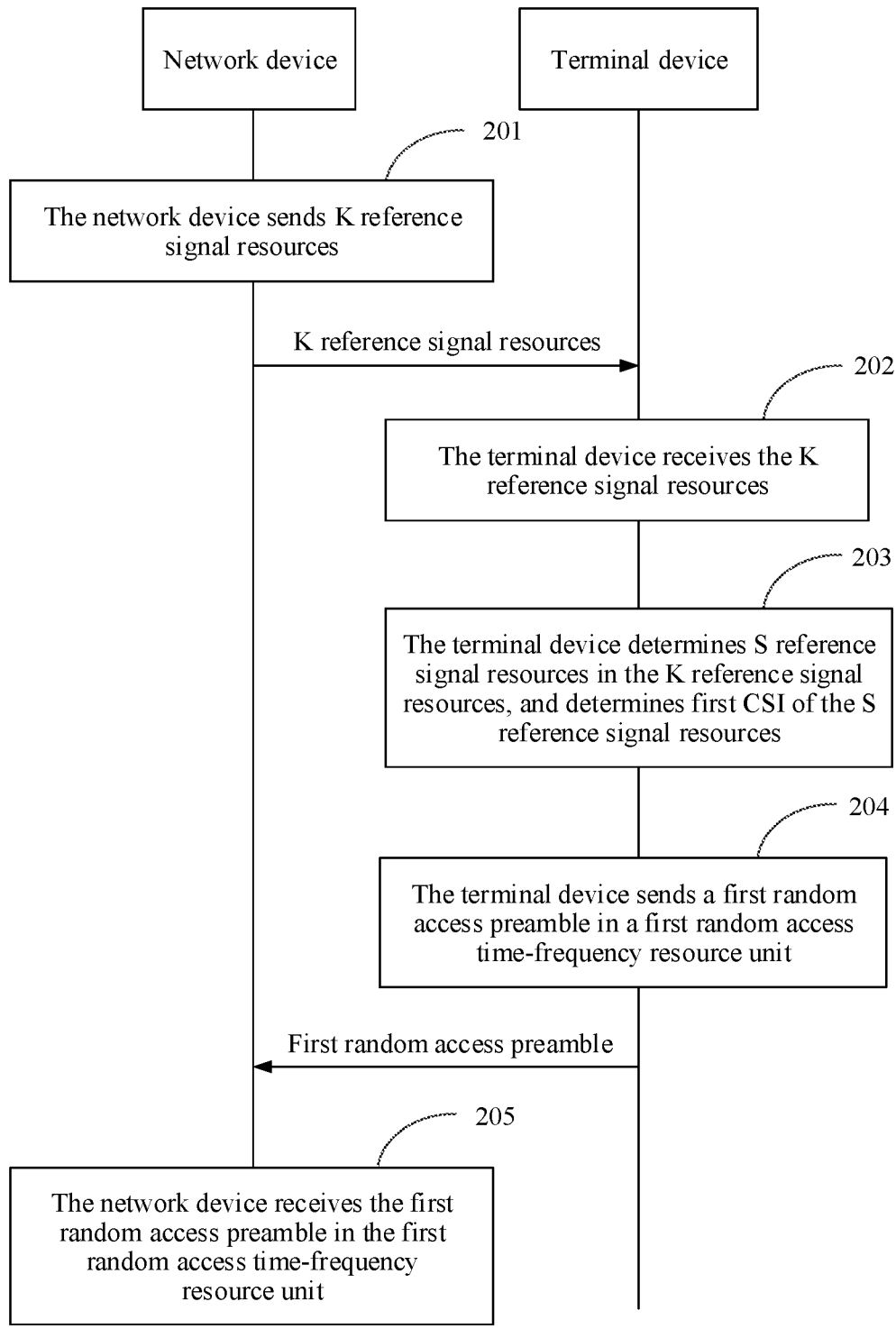
FIG. 2 is a schematic diagram of channel state information transmission according to an embodiment of this application.

FIG. 2 is a schematic flowchart of a channel state information transmission method according to an embodiment of this application. The method includes the following steps.

Step 201: A network device sends K reference signal resources.

K is an integer greater than 0. In this embodiment of this application, each of the K reference signal resources occupies a different time-frequency code resource. Optionally, one reference signal resource corresponds to one transmit beam, one transmit beam corresponds to one set of weighting coefficients for antenna ports, and the network device transmits different reference signals in different directions by using different weighting coefficients, to cover different areas. To distinguish between different reference signal resources, each reference signal resource may be uniquely indicated by using one index.

Optionally, the reference signal resource includes a synchronization signal block (synchronization signal block, SSB), and one SSB includes a primary synchronization signal, a secondary synchronization signal, and a physical broadcast channel (Physical Broadcast Channel, PBCH).

Optionally, the reference signal resource may be a cell-specific channel state information reference signal (channel state information reference signal, CSI-RS).

Optionally, the reference signal resource includes a cell-specific CSI-RS and a CSI interference measurement (Interference_Measurement, IM) reference signal, where the CSI-RS is used to measure channel information, and the CSI-IM is used to measure noise and/or interference information.

Optionally, the reference signal resource includes an SSB and CSI-IM, where the SSB is used to measure channel information, and the CSI-IM is used to measure noise and/or interference information.

Optionally, configuration information of the K reference signal resources, such as a value of K, a quantity of antenna ports of each reference signal resource, a time-frequency resource location of the reference signal resource, and a periodicity of the reference signal resource, is sent by the network device to a terminal device by using a system message. Optionally, the system message is a multicast message or a broadcast message. For example, the system message is a system information block 1 (system information block 1, SIB 1).

Step 202: The terminal device receives the K reference signal resources.

Step 203: The terminal device determines S reference signal resources in the K reference signal resources, and determines first CSI of the S reference signal resources.

S is an integer greater than 0 and less than or equal to K.

In this embodiment of this application, how the terminal device specifically determines CSI is not limited. For details, refer to descriptions in a conventional technology. The CSI may indicate received signal quality or channel quality of the S reference signal resources. In a possible implementation, S is equal to 1, and the terminal device may use CSI of a reference signal resource with optimal received signal quality as the first CSI.

In another possible implementation, S is greater than 1, and the terminal device may determine a plurality of reference signal resources, and determine CSI of each reference signal resource. For example, the terminal device may report S reference signal resources with optimal received signal quality to the network device, and determine CSI of each of the S reference signal resources as first CSI of each reference signal resource. For example, if the CSI includes an RI and a CQI, the terminal device reports indexes of the S reference signal resources, one RI of each reference signal resource, and a CQI of a value of the RI.

In another possible implementation, S is greater than 1, and the terminal device may determine a plurality of reference signal resources, and determine one piece of first CSI for the plurality of reference signal resources. For example, if the CSI includes an RI and a CQI, the terminal device may determine S reference signal resources, and determine one RI value and a CQI value of the RI value based on the S reference signal resources. The terminal device reports indexes of the S reference signal resources, the RI value, and the CQI value. It should be noted that, in this embodiment of this application, the CSI may include one or more of the following: a layer 1 reference signal received power (layer 1 reference signal received power, L1-RSRP), reference signal received quality (reference signal received quality, RSRQ), a reference signal received strength indicator (received signal strength indicator, RSSI), a layer 1 signal to interference and noise ratio (layer 1 signal to interference and noise ratio, L1-SINR), a channel quality indicator (channel quality indicator, CQI), a rank indicator (rank indicator, RI), and a precoding matrix indicator (precoding matrix indicator, PMI). In another possible implementation, the determined first CSI is greater than 1 and less than S.

Step 204: The terminal device sends a first random access preamble in a first random access time-frequency resource unit.

The S reference signal resources are associated with at least one of the first random access time-frequency resource unit and the first random access preamble, and/or the first CSI is associated with at least one of the first random access time-frequency resource unit and the first random access preamble.

In this embodiment of this application, a random access time-frequency resource unit is a time-frequency resource unit used by the terminal device to send a random access preamble. Optionally, one random access time-frequency resource unit may alternatively be one random access occasion (RACH occasion, RO). For ease of description, the random access time-frequency resource unit is used in the following. One random access time-frequency resource unit occupies one time unit in time domain, and occupies one or more frequency domain units in frequency domain. The time unit may be an orthogonal frequency division multiplexing (orthogonal frequency division multiplexing, OFDM) symbol, a slot (slot), a subframe, or the like. The frequency domain unit may be a resource element (resource element), a resource block (resource block), a subcarrier, or the like. In a communication system, specific time-frequency resources that may be used as random access time-frequency resource units in a radio frame may be determined through configuration of the network device or predefinition in a standard. For example, one radio frame has A slots, B groups of OFDM symbols in each of A1<A slots may be used as time units occupied by random access time-frequency resource units, and each group of OFDM symbols includes one or more OFDM symbols. The A1 slots are referred to as RACH slots. Further, in each of the B groups of OFDM symbols, the random access time-frequency resource units occupy C groups of different subcarriers in frequency domain, in other words, C random access time-frequency resource units are multiplexed in a same time unit in an FDM manner. In the foregoing example, in one radio frame, a quantity of random access time-frequency resource units is A1*B*C, and each random access time-frequency resource unit occupies one group of OFDM symbols in time domain, and occupies one group of subcarriers in frequency domain. For example, in one configuration, a 30 kHz subcarrier spacing is considered. In this case, A=20. A1=2 slots are used to send a random access preamble. In each of the A1 slots, B=6 groups of OFDM symbols are used as time units occupied by random access time-frequency resource units. Each group of OFDM symbols includes two OFDM symbols. In each OFDM symbol, a length of the random access preamble is 139. Therefore, each random access time-frequency unit occupies C=1 group of subcarriers in frequency domain, and the group of subcarriers includes 139 subcarriers. In this case, one radio frame has a total of A1*B*C=12 random access time units.

Optionally, the A1*B*C random access time-frequency resource units may be numbered in the following manner: Numbering is performed first in ascending order of indexes of frequency domain units occupied by random access time-frequency resource units multiplexed through FDM in one OFDM symbol, further in ascending order of indexes of OFDM symbols occupied by random access time-frequency resource units in one RACH slot, and then in ascending order of indexes of RACH slots. In an embodiment, the terminal may alternatively perform numbering by using one or more of the foregoing numbering orders, for example, only in ascending order of indexes of OFDM symbols occupied by random access time-frequency resource units in a RACH slot. The terminal device may select one random access time-frequency resource unit from a plurality of random access time-frequency resource units to send a random access preamble.

Step 205: The network device receives the first random access preamble in the first random access time-frequency resource unit.

According to the foregoing procedure provided in this embodiment of this application, the first random access time-frequency resource unit and the first random access preamble are associated with the first CSI. Therefore, the network device receives the first random access preamble by using the first random access time-frequency resource unit, may determine the first CSI, and therefore may perform downlink transmission based on the first CSI by using a high channel coding code rate and a high modulation scheme after the terminal device randomly accesses the network device, to improve data transmission efficiency.

In this embodiment of this application, an association relationship between a reference signal resource and a random access time-frequency resource unit and/or a random access preamble and an association relationship between CSI and a random access time-frequency resource unit and/or a random access preamble may be determined based on a first association relationship and/or a second association relationship. The first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

When determining the S reference signal resources and the first CSI of the S reference signal resources, the terminal device may determine, based on the first association relationship and the second association relationship, the first random access time-frequency resource unit and the first random access preamble that are associated with the S reference signal resources and the first CSI. Correspondingly, when receiving the first random access preamble, the network device may determine, based on the first association relationship and the second association relationship, the S reference signal resources and the first CSI that are associated with the first random access time-frequency resource unit and the first random access preamble.

The first association relationship may be configured by the network device by using a SIB 1, or may not be configured but is a predefined association relationship. The second association relationship may be a predefined association relationship, or may be configured by using a SIB 1. This is not limited in this embodiment of this application. There may be a plurality of specific implementations of the first association relationship and the second association relationship. This is not limited in this embodiment of this application. The following describes the first association relationship and the second association relationship only by using an example, and it does not mean that the first association relationship and the second association relationship can be implemented in only the following manners.

In this embodiment of this application, in a possible implementation, the first association relationship includes one or more of the following:

first information, where the first information is used to indicate a quantity Z of random access time-frequency resource units in a same time unit, a total quantity of random access time-frequency resource units associated with M reference signal resources is R, a total quantity of time units is J=R/Z, the M reference signal resources include the K reference signal resources, M is greater than or equal to K, and optionally, M may also be equal to K;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of all CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

The first association relationship described above is merely an example, and content specifically included in the first association relationship may be determined based on an actual situation.

Further, the second information, the third information, the fourth information, and the fifth information meet the following constraint condition:

$$X*1/Y \geq L*Q, \text{ and } X*\max\{Y,1\} \leq N; \text{ or}$$

$$Y \geq Q*L, \text{ and } X*Y \leq N, \text{ where max}\{\} \text{ is an operation of obtaining a maximum value.}$$

It should be noted that there may be a plurality of cases of CSI values of one reference signal resource. In a first possible scenario, when the CSI includes only the CQI, a quantity of all values of the CSI is equal to a quantity of all values of the CQI. For example, if values of the CQI are 0 to 3, there are four cases of all values of the CSI of one reference signal resource.

In a second possible scenario, when the CSI includes only the RI, a quantity of all values of the CSI is equal to a quantity of values of the RI. For example, if a value of the RI is 1 or 2, there are two cases of all values of the CSI of one reference signal resource.

In a third possible scenario, when the CSI includes the RI and the CQI, a quantity of all values of the CSI is equal to a product of a quantity of values of the RI and a quantity of values of the CQI. For example, a value of the RI is 1 or 2, and values of the CQI are 0 to 3. For ease of description, in this embodiment of this application, when the value of the CQI is 0, a CQI 0 is used. When the value of the CQI is 1, a CQI 1 is used. When the value of the CQI is 3, a CQI 3 is used. Other cases are deduced by analogy. In this case, there are eight cases of all values of the CSI of one reference signal resource. For details, refer to Table 1.

TABLE 1

| CSI |
| --- |
| RI = 1, CQI 0 |
| RI = 1, CQI 1 |
| RI = 1, CQI 2 |
| RI = 1, CQI 3 |
| RI = 2, CQI 0 |
| RI = 2, CQI 1 |
| RI = 2, CQI 2 |
| RI = 2, CQI 3 |

The foregoing is merely an example. When the CSI includes other content, for a method for determining a quantity of values of the CSI, refer to the foregoing descriptions. Examples are not described one by one herein. It should be noted that content included in the CSI may be agreed on in advance, or may be configured by the network device. This is not limited in this embodiment of this application.

It should be noted that R is a total quantity of random access time-frequency resource units in one periodicity. One periodicity may include F RACH periodicities, and F is a positive integer. One RACH periodicity may be configured by the network device. For example, one RACH periodicity is 80 ms, 160 ms, or 320 ms. A value of F may also be configured by the network device by using signaling. For example, F=1, 2, or 4.

In this embodiment, all or some of the R random access time-frequency resource units are associated with the K reference signal resources. Optionally, the network device determines the K reference signal resources for sending in the M initially configured reference signal resources, where M≥K, and notifies the terminal device of a value of K by using signaling. In this case, the network device and the terminal device may determine random access time-frequency resource units associated with the K reference signal resources in the R random access time-frequency resource units. In other words, the K reference signal resources are associated with some of the R random access time-frequency resource units. Optionally, the network device determines the K reference signal resources for sending in the M initially configured reference signal resources, and notifies the terminal device of a value of K by using signaling. In this case, the network device and the terminal device adjust an association relationship between the R random access time-frequency resource units and the K reference signal resources according to a predefined rule. In other words, the K reference signal resources are associated with the R random access time-frequency resource units. In this case, when K changes, the association relationship changes accordingly, and a value of M is no longer reflected in the association relationship. Further optionally, when the K reference signal resources are associated with the R random access time-frequency resource units, if R/(K/Y) is not an integer, in the R random access time-frequency resource units, some random access time-frequency resource units are associated with the K reference signal resources, and remaining random access time-frequency resource units are not associated with reference signal resources. For example, when R/(K/Y) is not an integer, R1=floor(R/(KN))*(K/Y) random access time-frequency resource units are associated with the K reference signal resources, where floor( ) indicates rounding down.

In this embodiment of this application, optionally, the N random access preambles are associated with the M reference signal resources, and the M reference signal resources include the K reference signal resources. Optionally, the N random access preambles are associated with the K reference signal resources. For details, refer to the descriptions in the foregoing paragraph. Details are not described again.

In this embodiment of this application, the parameters Z, Y, X, L, and Q in the first relationship may be configured in a plurality of manners. In a first possible scenario, all the parameters in the first relationship are configured by the network device by using signaling. In a second possible scenario, some parameters in the first relationship are configured by the network device, and the other parameters are predefined in a standard. This is not limited herein. In a third possible scenario, some parameters in the first relationship are configured by the network device or predefined, and the other parameters are determined through derivation based on a predefined mathematical relationship and the parameters determined in a configuration or predefinition manner. Another manner is not excluded.

As described above, the first association relationship may include only some of the first information to the fifth information. For example, the first association relationship may include the following information:

the first information, the second information, the third information, and the fifth information.

In this implementation, the second information, the third information, and the fifth information may meet the following constraint condition:

$X^*\max\{1/Y,1\} \geq Q$, and $X^*\max\{Y,1\} \leq N$, where max{ } is an operation of obtaining a maximum value.

Optionally, in this implementation, the fourth information L may be a predefined value, for example, L=1 or L=2. Another predefined value is not excluded. Optionally, in this implementation, the fourth information L may alternatively be determined based on the third information, the fifth information, and a predefined mathematical relationship. For example, the mathematical relationship is:

$$L = \begin{cases} X/Q, & Y \leq 1 \\ X/(YQ), & Y > 1 \end{cases}$$

Alternatively, the mathematical relationship is: L=X/(YQ).

For another example, the first association relationship may further include one or more of the following:

the first information, the second information, the fourth information, and the fifth information.

In this implementation, the second information, the fourth information, and the fifth information meet the following constraint condition:

$L^*Q^*\max\{Y,1\} \leq N$, or $L^*Q^*Y \leq N$.

Optionally, in this implementation, the third information X may be a predefined value.

Optionally, in this implementation, the third information X may alternatively be determined based on the fourth information, the fifth information, and a predefined mathematical relationship. For example, the mathematical relationship is X=LQ or $$X = \begin{cases} LQY, & Y \leq 1 \\ LQ, & Y > 1 \end{cases}.$$

Another mathematical relationship is not excluded, and details are not described herein.

The foregoing is merely an example, and there may be another implementation of the first association relationship. Examples are not described one by one herein.

It can be learned from the foregoing descriptions that one or more of the following association relationships may be obtained based on all or some of the parameters in the first association relationship: a quantity of ROs associated with one reference signal resource, or equivalently, a quantity of reference signal resources associated with one RO; in Q CSI values of one reference signal resource, a quantity Q' of values of CSI associated with one RO, where Q'≤Q; and a quantity of all random access preambles associated with one reference signal resource.

With reference to the foregoing descriptions, when the K reference signal resources are associated with the R random access time-frequency resource units, CSI of one of the K reference signal resources has Q values, and the K reference signal resources are associated with the N random access preambles, the second association relationship may include at least one of the following:

A first item is an order of associating the K reference signal resources with the R random access time-frequency resource units and the N random access preambles.

Specifically, the K reference signal resources are successively associated with the R random access time-frequency resource units and the N random access preambles according to a first rule in ascending order of indexes of reference signal resources.

A general principle of the first rule is as follows: The K reference signal resources are associated with the R random access time-frequency resource units and the N random access preambles first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit.

Further optionally, the first rule may also be described as follows:
1. In each random access time-frequency resource unit, reference signal resources associated with the random access time-frequency resource unit are associated with random access preambles in ascending order of indexes of random access preambles.
2. In a same time unit, reference signal resources are associated with different random access time-frequency resource units in ascending order of indexes of frequency domain resources occupied by random access time-frequency resource units.
3. Reference signal resources are associated with different random access time-frequency resource units in ascending order of indexes of time domain resources occupied by random access time-frequency resource units.

A second item is an order of associating the CSI of each of the K reference signal resources with the R random access time-frequency resource units and the N random access preambles.

The K reference signal resources and Q values of the CSI of each of the K reference signal resources are successively associated with the N random access preambles and the R random access time-frequency resource units according to the first rule in a predefined order.

When the CSI includes different content, predefined orders are also different. For example, when the CSI includes the CQI, in a first possible predefined order, CQIs of one reference signal resource are first sorted in ascending order, and then indexes of reference signal resources are sorted in ascending order.

When the CSI includes the RI and the CQI, in a second possible predefined order, CQIs of one RI of one reference signal resource are first sorted in ascending order, RIs of the reference signal resource are further sorted in ascending order, and then indexes of reference signal resources are sorted in ascending order.

When the CSI includes the RI and the CQI, in a third possible predefined order, CQIs of one RI of one reference signal resource are first sorted in ascending order, indexes of reference signal resources are further sorted in ascending order, and then RIs of the reference signal resource are sorted in ascending order.

The foregoing is merely an example, and there may be another implementation of the predefined order. Examples are not described one by one herein.

The terminal device may determine, based on the first association relationship and the second association relationship in reference signal resources associated with one random access time-frequency resource unit, a random access preamble associated with one reference signal resource and a random access preamble associated with any CSI value of the reference signal resource.

Optionally, Q CSI values of one SSB need to be associated with $L*Q$ random access preambles based on values of L and Q. Because one SSB associated with one RO is associated with X preambles, the $L*Q$ preambles need to be associated with $ceil(L*Q/X)=X'$ ROs, where ceil( ) indicates rounding up. Each RO is associated with $T=Q/X'$ CSI values. $Y \leq 1$ and $Y > 1$ are separately discussed below.

When $Y \leq 1$, one SSB may be associated with $1/Y$ ROs with consecutive indexes. In this case, $X/Y \geq L*Q$ and $X \leq N$ need to be met. Further, in the $1/Y$ ROs associated with one SSB, T CSI values of the SSB corresponding to an $(i+g*X')^{th}$ RO are $i*(Q/X')$ to $(i+1)*(Q/X')-1$, where $i=0, 1, \ldots, X'$, $g=0, 1, \ldots, G-1$, and $G=ceil(1/(Y*X'))$. In this case, optionally, in T pieces of CSI corresponding to one RO, index values of L random access preambles associated with a $j^{th}$ piece of CSI are $j*N/T$ to $j*N/T+L-1$, where $j=0, 1, \ldots, T-1$. Alternatively, optionally, in T pieces of CSI corresponding to one RO, index values of L random access preambles associated with a $j^{th}$ piece of CSI (that is, a CQI j) are $j*L$ to $j*L+L-1$, where $j=0, 1, \ldots, T-1$. Optionally, it is constrained that $Q*L/X$ is a positive integer, $Q*L$ needs to be an integer multiple of X, and $X/L$ is a positive integer, that is, X is an integer multiple of L. A to B indicate all integers greater than or equal to A and less than or equal to B.

When $Y > 1$, Y SSBs with consecutive indexes are associated with a same RO. In this case, $X*Y \leq N$ and $Q*L \leq N/Y$ are required. That is, one RO is associated with all Q CSI values of the SSB. Optionally, in Q pieces of CSI associated with a $k^{th}$ SSB, index values of L random access preambles associated with $j^{th}$ piece of CSI are $k*N/Y+j*N/(Y*Q)$ to $k*N/Y+j*N/(Y*Q)+L-1$, where $j=0, 1, \ldots, Q-1$, and $k=0, 1, \ldots, Y-1$. Optionally, in the Q pieces of CSI associated with the $k^{th}$ SSB, index values of L random access preambles associated with a $j^{th}$ CQI are $k*N/Y+j*L$ to $k*N/Y+j*L+L-1$. Optionally, it is constrained that $N/Y$ is a positive integer, that is, N is an integer multiple of Y. A to B indicate all integers greater than or equal to A and less than or equal to B.

When the CSI includes the CQI, default values are used for the RI and the PMI. In this case, Q values of the CSI correspond to Q CQI values. When the CSI includes the CQI and RI, a default value is used for the PMI. In this case, Q values of the CSI are jointly determined based on Q1 CQI values and Q2 RI values. For example, an $(a*Q1+b)^{th}$ value of the CSI is determined based on a $b^{th}$ CQI value and an $a^{th}$ RI value, where $a=0, 1, \ldots, Q2-1$, and $b=0, 1, \ldots, Q-1-1$.

The following describes, by using specific embodiments, how to determine an association relationship among the reference signal resource, the CSI, the random access time-frequency resource unit, and the random access preamble based on the first association relationship and the second association relationship. In the following embodiments, an example in which one piece of CSI is determined based on one reference signal resource is used for description. For a scenario in which one piece of CSI is determined based on a plurality of reference signal resources, refer to descriptions in the following embodiments. Details are not described herein again.

Embodiment 1

A network device sends eight reference signal resources. The eight reference signal resources are associated with R=32 random access time-frequency resource units, and the eight reference signal resources are associated with N=64 random access preambles. The eight reference signal resources are successively an SSB 1 to an SSB 8 in ascending order of indexes. CSI includes a CQI, and a quantity of values of CSI associated with each reference signal resource is Q=4, that is, a value range of the CQI is 0 to 3. A specific value of each piece of information in a first association relationship is as follows:

Z indicated by first information is equal to 4, that is, a quantity of random access time-frequency resource units in a same time unit is equal to 4.

Y indicated by second information is equal to ½, that is, a quantity of reference signal resources associated with one random access time-frequency resource unit is equal to ½. In other words, one reference signal resource is associated with two random access time-frequency resource units with consecutive indexes.

X indicated by third information is equal to 32, that is, in a reference signal resource associated with one random access time-frequency resource unit, a quantity of random access preambles associated with the reference signal resource is equal to 32.

Figure 3:
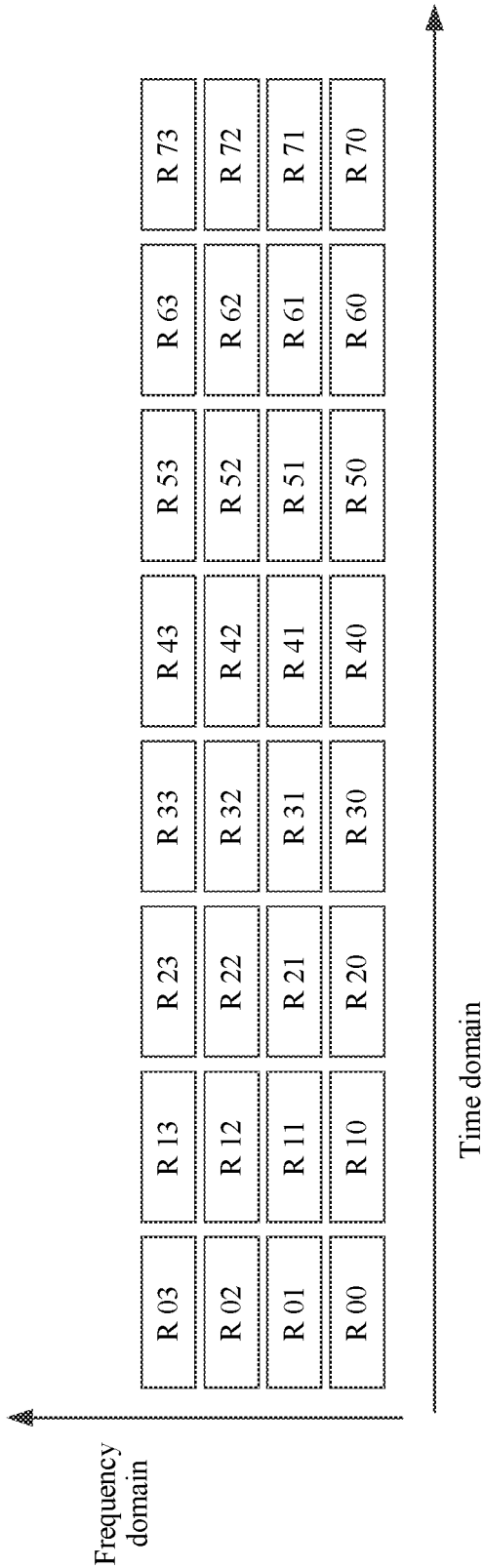
FIG. 3 is a schematic diagram of a random access time-frequency resource unit according to an embodiment of this application.

L indicated by fourth information is equal to 16, that is, a quantity of random access preambles associated with any CSI value of one reference signal resource is equal to 16. As shown in FIG. 3, indexes of the 32 random access time-frequency resource units are successively 0 to 31 first in ascending order of frequency domain indexes and then in ascending order of time domain indexes based on the first association relationship. A random access time-frequency resource unit with the index 0 is R 00, a random access time-frequency resource unit with the index 1 is R 01, a random access time-frequency resource unit with the index 2 is R 02, a random access time-frequency resource unit with the index 3 is R 03, a random access time-frequency resource unit with the index 4 is R 10, a random access time-frequency resource unit with the index 5 is R 11, . . . , and a random access time-frequency resource unit with the index 31 is R 73.

With reference to the foregoing second association relationship, because Y=½, it indicates that the two random access time-frequency resource units with the consecutive indexes are associated with the reference signal resource. In this case, the SSB 1 may be first selected in ascending order of indexes of reference signal resources. Then, it may be determined, according to a first rule, that random access time-frequency resource units associated with the SSB 1 are R 00 and R 01. After the random access time-frequency resource units associated with the SSB 1 are determined, the SSB 2 is selected in ascending order of indexes of reference signal resources. Then, it may be determined, according to the first rule, that random access time-frequency resource units associated with the SSB 2 are R 02 and R 03. The SSB 3 is selected in ascending order of indexes of reference signal resources. Then, it may be determined, according to the first rule, that random access time-frequency resource units associated with the SSB 3 are R 10 and R 11. Other reference signal resources may be deduced by analogy, and details are not described again.

Figure 4:
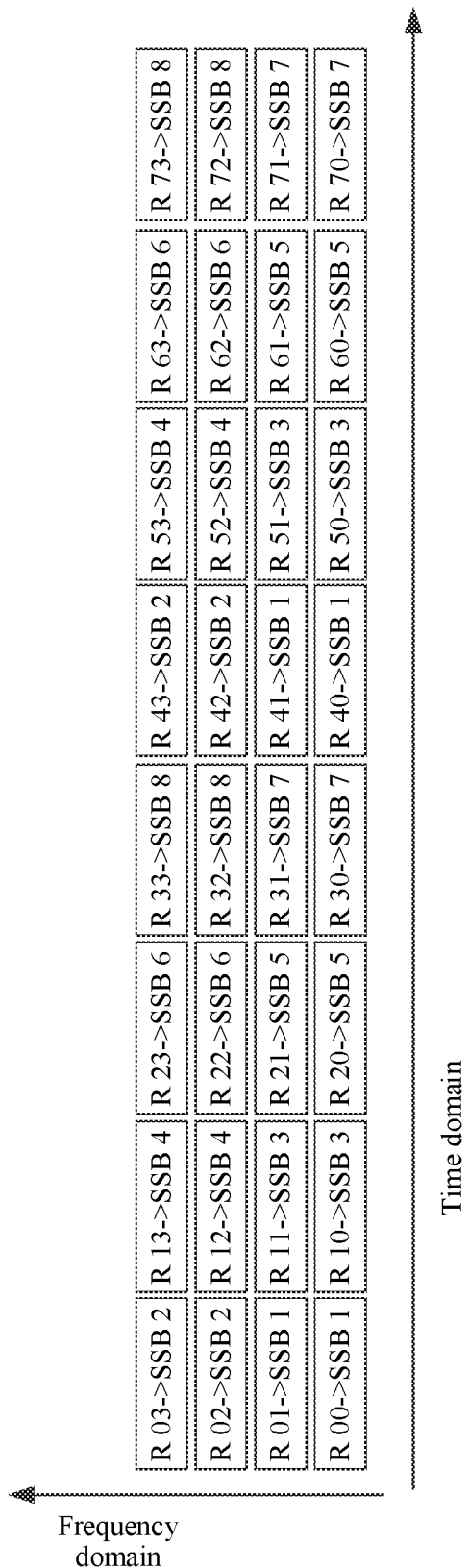
FIG. 4 is a schematic diagram of associating a random access time-frequency resource unit with a reference signal resource according to an embodiment of this application.

For a finally determined association relationship between the eight reference signal resources and the 32 random access time-frequency resource units, refer to FIG. 4. In FIG. 4, one time unit includes four random access time-frequency resource units, and the reference signal resource SSB 1 is associated with the random access time-frequency resource units R 00 and R 01, respectively denoted as R 00→SSB 1 and R 01→SSB 1. An association relationship between another reference signal resource and random access time-frequency resource units may be deduced by analogy based on the schematic diagram in FIG. 4.

Further, according to L=16, Q=4, N=64, and X=32, it can be learned that X'=L*Q/X=2, T=Q/X'=2, and G=1. That is, four CSI values of one SSB are mapped to X'=2 ROs. The SSB may be mapped to 1/Y=2 ROs. Therefore, in the two ROs, an $(i=0)^{th}$ RO is associated with a CQI 0 and a CQI 1 of the SSB, and i=1 ROs associated with the SSB are associated with a CQI 2 and a CQI 3 of the SSB. Indexes of L random access preambles associated with the CQI 0 and the CQI 2 are 0, 1, 2, . . . , and 15, and indexes of L random access preambles associated with the CQI 1 and the CQI 3 are 32, 33, . . . , and 47.

If only a configuration value of X in this embodiment is changed, that is, X=64, and other parameters remain unchanged, X'=1, T=4, and G=2. In this case, in 1/Y=2 ROs associated with one SSB, an $(i=0)^{th}$ RO is associated with a CQI 0 to a CQI 3 of the SSB, and an $(i=1)^{th}$ RO is also associated with the CQI 0 to the CQI 3 of the SSB. Indexes of L random access preambles associated with the CQI 0 are 0, 1, 2, . . . , and 15, indexes of L random access preambles associated with the CQI 1 are 16, 17, 18, . . . , and 31, indexes of L random access preambles associated with the CQI 2 are 32, 33, . . . , and 47, and indexes of L random access preambles associated with the CQI 3 are 0, 1, 2, . . . , and 63.

If a value of Y and a value of X in this embodiment are changed to Y=2 and X=128, and other parameters remain unchanged, that is, N=64, Z=4, L=16, and Q=4, one RO is associated with two SSBs. Indexes of L random access preambles associated with a CQI 0 of a $(k=0)^{th}$ SSB are 0 to 15, indexes of L random access preambles associated with a CQI 1 of the $(k=0)^{th}$ SSB are 16 to 31, indexes of L random access preambles associated with a CQI 2 of the $(k=0)^{th}$ SSB are 32 to 47, and indexes of L random access preambles associated with a CQI 3 of the $(k=0)^{th}$ SSB are 48 to 63. Indexes of L random access preambles associated with a CQI 0 of a $(k=1)^{th}$ SSB are 64 to 79, indexes of L random access preambles associated with a CQI 1 of the $(k=1)^{th}$ SSB are 80 to 95, indexes of L random access preambles associated with a CQI 2 of the $(k=1)^{th}$ SSB are 96 to 111, and indexes of L random access preambles associated with the CQI 3 of the $(k=1)^{th}$ SSB are 112 to 127.

Embodiment 2

A network device sends eight reference signal resources. The eight reference signal resources are associated with R=32 random access time-frequency resource units, and the eight reference signal resources are associated with N=64 random access preambles. The eight reference signal resources are successively an SSB 1 to an SSB 8 in ascending order of indexes. CSI includes a CQI, and a quantity of values of CSI associated with each reference signal resource is 4, that is, a value range of the CQI is a CQI 0 to a CQI 3. A specific value of each piece of information in a first association relationship is as follows:

Z indicated by first information is equal to 4, that is, a quantity of random access time-frequency resource units in a same time unit is equal to 4.

Y indicated by second information is equal to ½, that is, a quantity of reference signal resources associated with one random access time-frequency resource unit is equal to ½. In other words, one reference signal resource is associated with two random access time-frequency resource units with consecutive indexes.

X indicated by third information is equal to 4, that is, in a reference signal resource associated with one random access time-frequency resource unit, a quantity of random access preambles associated with the reference signal resource is equal to 4.

L indicated by fourth information is equal to 1, that is, a quantity of random access preambles associated with any CSI value of one reference signal resource is equal to 1. As shown in FIG. 3, indexes of the 32 random access time-frequency resource units are successively 0 to 31 first in ascending order of frequency domain indexes and then in ascending order of time domain indexes based on the first association relationship. A random access time-frequency resource unit with the index 0 is R 00, a random access time-frequency resource unit with the index 1 is R 01, a random access time-frequency resource unit with the index 2 is R 02, a random access time-frequency resource unit with the index 3 is R 03, a random access time-frequency resource unit with the index 4 is R 10, a random access time-frequency resource unit with the index 5 is R 11, . . . , and a random access time-frequency resource unit with the index 31 is R 73.

With reference to the foregoing second association relationship, because Y=½, it indicates that the two random access time-frequency resource units with the consecutive indexes are associated with the reference signal resource. In this case, the SSB 1 may be first selected in ascending order of indexes of reference signal resources. Then, it may be determined, according to a first rule, that random access time-frequency resource units associated with the SSB 1 are R 00 and R 01. After the random access time-frequency resource units associated with the SSB 1 are determined, the SSB 2 is selected in ascending order of indexes of reference signal resources. Then, it may be determined, according to the first rule, that random access time-frequency resource units associated with the SSB 2 are R 02 and R 03. The SSB 3 is selected in ascending order of indexes of reference signal resources. Then, it may be determined, according to the first rule, that random access time-frequency resource units associated with the SSB 3 are R 10 and R 11. Other reference signal resources may be deduced by analogy, and details are not described again.

For a finally determined association relationship between the eight reference signal resources and the 32 random access time-frequency resource units, refer to FIG. 4. In FIG. 4, one time unit includes four random access time-frequency resource units, and the reference signal resource SSB 1 is associated with the random access time-frequency resource units R 00 and R 01, respectively denoted as R 00→SSB 1 and R 01→SSB 1. An association relationship between another reference signal resource and random access time-frequency resource units may be deduced by analogy based on the schematic diagram in FIG. 4.

Further, with reference to the foregoing example, the CSI associated with each reference signal resource has four values, which are respectively the CQIs 0, 1, 2, and 3. Based on the first association relationship, L=1, it indicates that an association relationship between CSI associated with each reference signal resource and a random access preamble may be that shown in Table 2 in this case.

TABLE 2

| Reference signal resource | CSI of the reference signal resource | Random access preamble associated with the CSI | Random access time-frequency resource unit |
|---|---|---|---|
| SSB 1 | CQI 0 | Preamble 0 | R 00 and R 01 |
|  | CQI 1 | Preamble 1 | R 00 and R 01 |
|  | CQI 2 | Preamble 2 | R 00 and R 01 |
|  | CQI 3 | Preamble 3 | R 00 and R 01 |
| SSB 2 | CQI 0 | Preamble 0 | R 02 and R 03 |
|  | CQI 1 | Preamble 1 | R 02 and R 03 |
|  | CQI 2 | Preamble 2 | R 02 and R 03 |
|  | CQI 3 | Preamble 3 | R 02 and R 03 |
| SSB 3 | CQI 0 | Preamble 0 | R 10 and R 11 |
|  | CQI 1 | Preamble 1 | R 10 and R 11 |
|  | CQI 2 | Preamble 2 | R 10 and R 11 |
|  | CQI 3 | Preamble 3 | R 10 and R 11 |
| SSB 4 | CQI 0 | Preamble 0 | R 12 and R 13 |
|  | CQI 1 | Preamble 1 | R 12 and R 13 |
|  | CQI 2 | Preamble 2 | R 12 and R 13 |
|  | CQI 3 | Preamble 3 | R 12 and R 13 |
| SSB 5 | CQI 0 | Preamble 0 | R 20 and R 21 |
|  | CQI 1 | Preamble 1 | R 20 and R 21 |
|  | CQI 2 | Preamble 2 | R 20 and R 21 |
|  | CQI 3 | Preamble 3 | R 20 and R 21 |
| SSB 6 | CQI 0 | Preamble 0 | R 22 and R 23 |
|  | CQI 1 | Preamble 1 | R 22 and R 23 |
|  | CQI 2 | Preamble 2 | R 22 and R 23 |
|  | CQI 3 | Preamble 3 | R 22 and R 23 |
| SSB 7 | CQI 0 | Preamble 0 | R 30 and R 31 |
|  | CQI 1 | Preamble 1 | R 30 and R 31 |
|  | CQI 2 | Preamble 2 | R 30 and R 31 |
|  | CQI 3 | Preamble 3 | R 30 and R 31 |
| SSB 8 | CQI 0 | Preamble 0 | R 32 and R 33 |
|  | CQI 1 | Preamble 1 | R 32 and R 33 |
|  | CQI 2 | Preamble 2 | R 32 and R 33 |
|  | CQI 3 | Preamble 3 | R 32 and R 33 |
| SSB 1 | CQI 0 | Preamble 0 | R 40 and R 41 |
|  | CQI 1 | Preamble 1 | R 40 and R 41 |
|  | CQI 2 | Preamble 2 | R 40 and R 41 |
|  | CQI 3 | Preamble 3 | R 40 and R 41 |
| SSB 2 | CQI 0 | Preamble 0 | R 42 and R 43 |
|  | CQI 1 | Preamble 1 | R 42 and R 43 |
|  | CQI 2 | Preamble 2 | R 42 and R 43 |
|  | CQI 3 | Preamble 3 | R 42 and R 43 |
| SSB 3 | CQI 0 | Preamble 0 | R 50 and R 51 |
|  | CQI 1 | Preamble 1 | R 50 and R 51 |
|  | CQI 2 | Preamble 2 | R 50 and R 51 |
|  | CQI 3 | Preamble 3 | R 50 and R 51 |
| SSB 4 | CQI 0 | Preamble 0 | R 52 and R 53 |
|  | CQI 1 | Preamble 1 | R 52 and R 53 |
|  | CQI 2 | Preamble 2 | R 52 and R 53 |
|  | CQI 3 | Preamble 3 | R 52 and R 53 |
| SSB 5 | CQI 0 | Preamble 0 | R 60 and R 61 |
|  | CQI 1 | Preamble 1 | R 60 and R 61 |
|  | CQI 2 | Preamble 2 | R 60 and R 61 |
|  | CQI 3 | Preamble 3 | R 60 and R 61 |
| SSB 6 | CQI 0 | Preamble 0 | R 62 and R 63 |
|  | CQI 1 | Preamble 1 | R 62 and R 63 |
|  | CQI 2 | Preamble 2 | R 62 and R 63 |
|  | CQI 3 | Preamble 3 | R 62 and R 63 |
| SSB 7 | CQI 0 | Preamble 0 | R 70 and R 71 |
|  | CQI 1 | Preamble 1 | R 70 and R 71 |
|  | CQI 2 | Preamble 2 | R 70 and R 71 |
|  | CQI 3 | Preamble 3 | R 70 and R 71 |
| SSB 8 | CQI 0 | Preamble 0 | R 72 and R 73 |
|  | CQI 1 | Preamble 1 | R 72 and R 73 |
|  | CQI 2 | Preamble 2 | R 72 and R 73 |
|  | CQI 3 | Preamble 3 | R 72 and R 73 |

Figure 5:
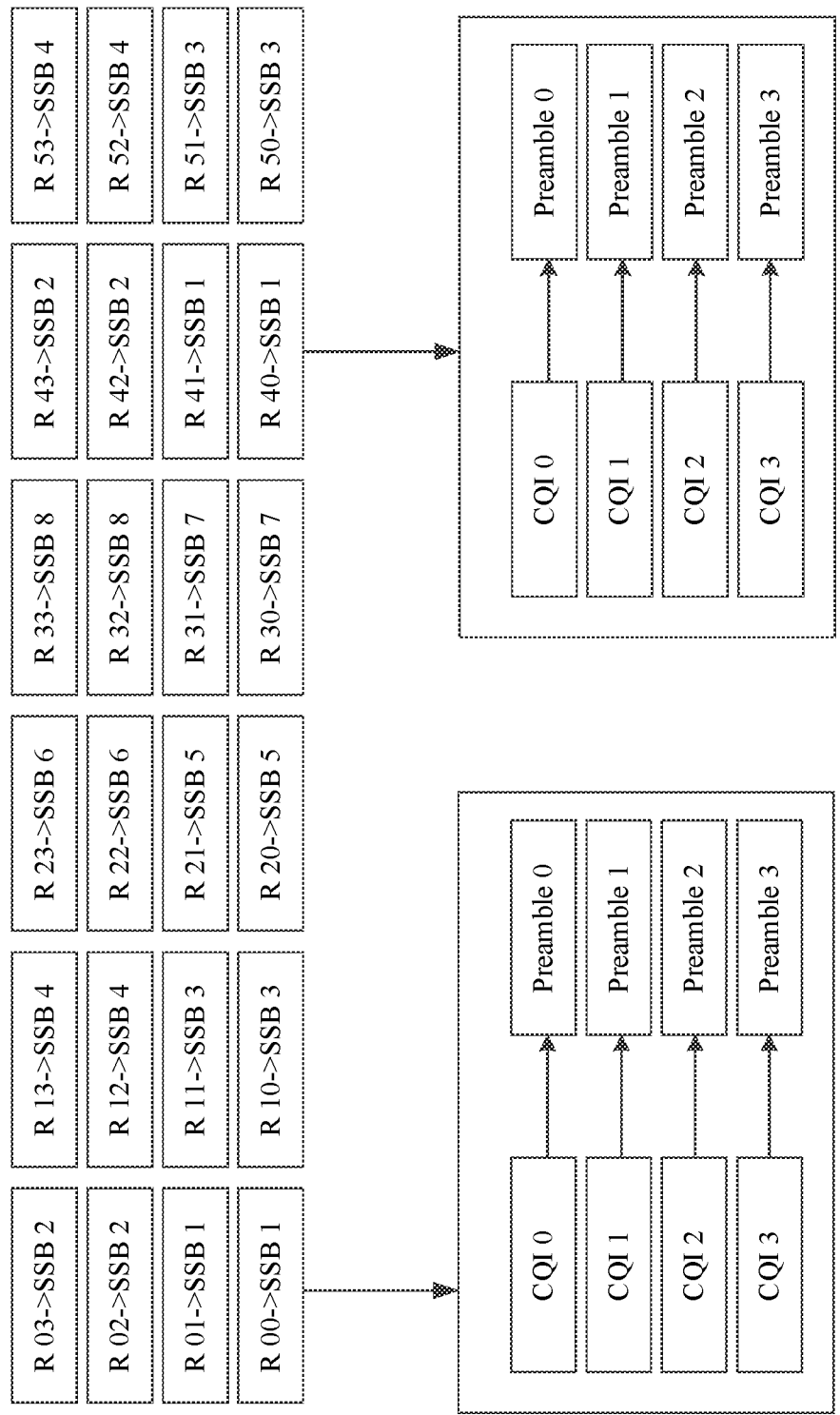
FIG. 5 is a schematic diagram of association according to an embodiment of this application.

With reference to Table 2 and FIG. 4, as shown in FIG. 5, FIG. 5 merely illustrates reference signal resources, random access preambles, and values of CSI that are separately associated with R 00 and R 40, and details are not described in other cases.

In Table 2, a quantity correspondence among a reference signal resource, CSI, and a random access preamble is determined based on the first association relationship. For example, X=4, correspondingly, in Table 2, one reference signal resource is associated with four random access preambles. L=1, correspondingly, in Table 2, any value of CSI is associated with one random access preamble.

In Table 2, one reference signal resource corresponds to two random access time-frequency resource units, and CSI corresponding to one reference signal resource has four values. It may be determined, with reference to X=4 and L=1, that each of two random access time-frequency resource units associated with one reference signal resource is associated with four values of CSI associated with the reference signal resource.

With reference to the foregoing descriptions, when receiving the eight reference signal resources, a terminal device determines that channel quality corresponding to the reference signal resource SSB 1 is optimal, and selects the reference signal resource SSB 1. If CSI determined by the terminal device based on the reference signal resource SSB 1 is the CQI 0, in this case, with reference to FIG. 4 and Table 2, in a first possible implementation, a random access time-frequency resource unit selected by the terminal device is R 00 or R 01, and a selected random access preamble is the preamble 0. Therefore, the terminal device may send the preamble 0 to the network device by using the random access time-frequency resource unit R 00 or R 01. Correspondingly, when a random access preamble received by the network device by using the random access time-frequency resource unit R 00 or R 01 is the preamble 0, the network device may determine that the terminal device selects the reference signal resource SSB 1 and CSI of the reference signal resource SSB 1 is the CQI 0. Optionally, that the foregoing optimal channel quality may be a maximum throughput calculated by the terminal device, a maximum signal-to-noise ratio, a maximum reference signal received power, or the like. This is not limited. Optionally, no order is limited to that the terminal device determines a reference signal resource and determines CSI of the reference signal resource, and the reference signal resource and the CSI of the reference signal resource may be determined together.

In a second possible implementation, a random access time-frequency resource unit selected by the terminal device is R 40 or R 41, and a selected random access preamble is the preamble 0. Therefore, the terminal device may send the preamble 0 to the network device by using the random access time-frequency resource unit R 40 or R 41. Correspondingly, when a random access preamble received by the network device by using the random access time-frequency resource unit R 40 or R 41 is the preamble 0, the network device may determine that the terminal device selects the reference signal resource SSB 1 and CSI of the reference signal resource SSB 1 is the CQI 0. Other cases may be deduced by analogy, and details are not described again.

Embodiment 3

A network device sends eight reference signal resources. The eight reference signal resources are associated with R=32 random access time-frequency resource units, and the eight reference signal resources are associated with 32 random access preambles. The eight reference signal resources are successively an SSB 1 to an SSB 8 in ascending order of indexes. CSI includes a CQI. The network device configures specific values of a part of information in a first association relationship by using signaling as follows:

Z indicated by first information is equal to 4.
Y indicated by second information is equal to ½.
X indicated by third information is equal to 2.
L indicated by fourth information is equal to 1.

In this embodiment, fifth information may be obtained by using the third information, the fourth information, and a predefined mathematical relationship. In this embodiment, the predefined mathematical relationship is X=L*Q*Y, and in this case, the fifth information Q=X/L/Y=4. To be specific, a quantity of values of CSI associated with each reference signal resource is 4, that is, a value range of the CQI is 0 to 3. The four values of the CSI are associated with random access time-frequency resource units with T=2 consecutive indexes.

FIG. 3 is still used as an example. The 32 random access time-frequency resource units are successively R 00, R 01, R 02, R 03, R 10, R 11, . . . , and R 73 first in ascending order of frequency domain indexes and then in ascending order of time domain indexes based on the first association relationship.

With reference to the foregoing second association relationship, for a finally determined association relationship between the eight reference signal resources and the 32 random access time-frequency resource units, refer to FIG. 4.

Further, with reference to the foregoing example, the CSI associated with each reference signal resource has four values, which are respectively the CQIs 0, 1, 2, and 3. Based on the first association relationship, L=1, it indicates that any value of CSI is associated with one random access preamble, and an association relationship between CSI associated with each reference signal resource and a random access preamble may be that shown in Table 3 in this case.

TABLE 3

| Reference signal resource | CSI associated with the reference signal resource | Random access preamble associated with the CSI | Random access time-frequency resource unit |
|---|---|---|---|
| SSB 1 | CQI 0 | Preamble 0 | R 00 |
|  | CQI 1 | Preamble 1 | R 00 |
|  | CQI 2 | Preamble 0 | R 01 |
|  | CQI 3 | Preamble 1 | R 01 |
| SSB 2 | CQI 0 | Preamble 0 | R 02 |
|  | CQI 1 | Preamble 1 | R 02 |
|  | CQI 2 | Preamble 0 | R 03 |
|  | CQI 3 | Preamble 1 | R 03 |
| SSB 3 | CQI 0 | Preamble 0 | R 10 |
|  | CQI 1 | Preamble 1 | R 10 |
|  | CQI 2 | Preamble 0 | R 11 |
|  | CQI 3 | Preamble 1 | R 11 |
| SSB 4 | CQI 0 | Preamble 0 | R 12 |
|  | CQI 1 | Preamble 1 | R 12 |
|  | CQI 2 | Preamble 0 | R 13 |
|  | CQI 3 | Preamble 1 | R 13 |
| SSB 5 | CQI 0 | Preamble 0 | R 20 |
|  | CQI 1 | Preamble 1 | R 20 |
|  | CQI 2 | Preamble 0 | R 21 |
|  | CQI 3 | Preamble 1 | R 21 |
| SSB 6 | CQI 0 | Preamble 0 | R 22 |
|  | CQI 1 | Preamble 1 | R 22 |
|  | CQI 2 | Preamble 0 | R 23 |
|  | CQI 3 | Preamble 1 | R 23 |
| SSB 7 | CQI 0 | Preamble 0 | R 30 |
|  | CQI 1 | Preamble 1 | R 30 |
|  | CQI 2 | Preamble 0 | R 31 |
|  | CQI 3 | Preamble 1 | R 31 |

TABLE 3-continued

| Reference signal resource | CSI associated with the reference signal resource | Random access preamble associated with the CSI | Random access time-frequency resource unit |
|---|---|---|---|
| SSB 8 | CQI 0 | Preamble 0 | R 32 |
|  | CQI 1 | Preamble 1 | R 32 |
|  | CQI 2 | Preamble 0 | R 33 |
|  | CQI 3 | Preamble 1 | R 33 |
| SSB 1 | CQI 0 | Preamble 0 | R 40 |
|  | CQI 1 | Preamble 1 | R 40 |
|  | CQI 2 | Preamble 0 | R 41 |
|  | CQI 3 | Preamble 1 | R 41 |
| SSB 2 | CQI 0 | Preamble 0 | R 42 |
|  | CQI 1 | Preamble 1 | R 42 |
|  | CQI 2 | Preamble 0 | R 43 |
|  | CQI 3 | Preamble 1 | R 43 |
| SSB 3 | CQI 0 | Preamble 0 | R 50 |
|  | CQI 1 | Preamble 1 | R 50 |
|  | CQI 2 | Preamble 0 | R 51 |
|  | CQI 3 | Preamble 1 | R 51 |
| SSB 4 | CQI 0 | Preamble 0 | R 52 |
|  | CQI 1 | Preamble 1 | R 52 |
|  | CQI 2 | Preamble 0 | R 53 |
|  | CQI 3 | Preamble 1 | R 53 |
| SSB 5 | CQI 0 | Preamble 0 | R 60 |
|  | CQI 1 | Preamble 1 | R 60 |
|  | CQI 2 | Preamble 0 | R 61 |
|  | CQI 3 | Preamble 1 | R 61 |
| SSB 6 | CQI 0 | Preamble 0 | R 62 |
|  | CQI 1 | Preamble 1 | R 62 |
|  | CQI 2 | Preamble 0 | R 63 |
|  | CQI 3 | Preamble 1 | R 63 |
| SSB 7 | CQI 0 | Preamble 0 | R 70 |
|  | CQI 1 | Preamble 1 | R 70 |
|  | CQI 2 | Preamble 0 | R 71 |
|  | CQI 3 | Preamble 1 | R 71 |
| SSB 8 | CQI 0 | Preamble 0 | R 72 |
|  | CQI 1 | Preamble 1 | R 72 |
|  | CQI 2 | Preamble 0 | R 73 |
|  | CQI 3 | Preamble 1 | R 73 |

Figure 6:
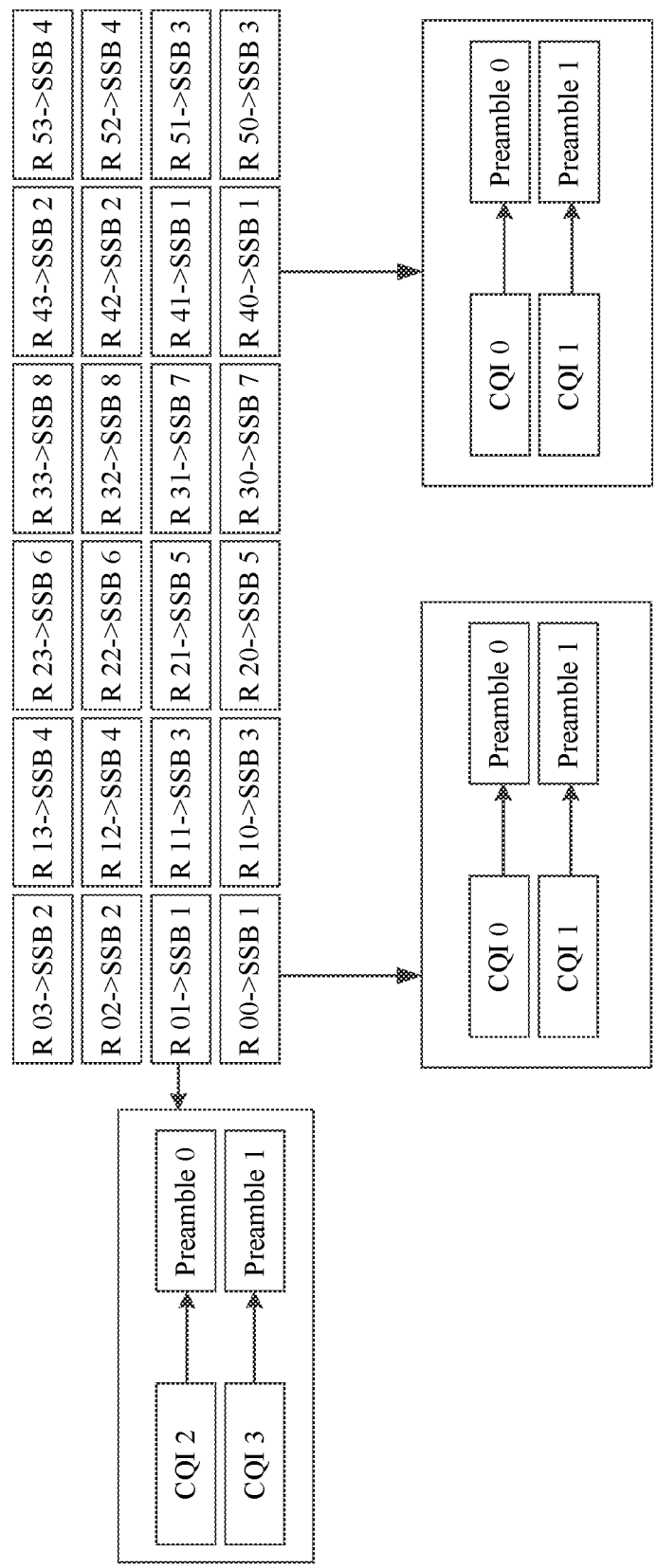
FIG. 6 is a schematic diagram of association according to an embodiment of this application.

With reference to Table 3 and FIG. 4, as shown in FIG. 6, FIG. 6 merely illustrates reference signal resources, random access preambles, and values of CSI that are separately associated with R 00, R 01, and R 40, and details are not described in other cases.

In Table 3, a quantity correspondence among a reference signal resource, CSI, and a random access preamble is determined based on the first association relationship. For example, X=2, correspondingly, in Table 3, one reference signal resource is associated with two random access preambles. L=1, correspondingly, in Table 3, any value of CSI is associated with one random access preamble.

In Table 3, one reference signal resource corresponds to two random access time-frequency resource units, and CSI corresponding to one reference signal resource has four values. It may be determined, with reference to X=2 and L=1, that each of two random access time-frequency resource units associated with one reference signal resource is associated with two values of CSI associated with the reference signal resource.

With reference to the foregoing descriptions, when receiving the eight reference signal ions, when receiving the eight reference signal resources, a terminal device determines that channel quality corresponding to the reference signal resource SSB 1 is optimal, and selects the reference signal resource SSB 1. If CSI determined by the terminal device based on the reference signal resource SSB 1 is the CQI 3, in this case, with reference to FIG. 4 and Table 3, in a first possible implementation, a random access time-frequency resource unit selected by the terminal device is R 01, and a selected random access preamble is the preamble 0. Therefore, the terminal device may send the preamble 0 to the network device by using the random access time-frequency resource unit R 01. Correspondingly, when a random access preamble received by the network device by using the random access time-frequency resource unit R 01 is the preamble 0, the network device may determine that the terminal device selects the reference signal resource SSB 1 and CSI of the reference signal resource SSB 1 is the CQI 3. Optionally, that the foregoing optimal channel quality may be a maximum throughput calculated by the terminal device, a maximum signal-to-noise ratio, a maximum reference signal received power, or the like. This is not limited. Optionally, no order is limited to that the terminal device determines a reference signal resource and determines CSI of the reference signal resource, and the reference signal resource and the CSI of the reference signal resource may be determined together.

In a second possible implementation, a random access time-frequency resource unit selected by the terminal device is R 41, and a selected random access preamble is a preamble 17. Therefore, the terminal device may send the preamble 17 to the network device by using the random access time-frequency resource unit R 41. Correspondingly, when a random access preamble received by the network device by using the random access time-frequency resource unit R 41 is the preamble 17, the network device may determine that the terminal device selects the reference signal resource SSB 1 and CSI of the reference signal resource SSB 1 is the CQI 3. Other cases may be deduced by analogy, and details are not described again.

Embodiment 4

A network device sends eight reference signal resources. The eight reference signal resources are associated with R=32 random access time-frequency resource units, and the eight reference signal resources are associated with N=32 random access preambles. The eight reference signal resources are successively an SSB 1 to an SSB 8 in ascending order of indexes. CSI includes an RI and a CQI. A value range of the CQI is 0 to 3, and a value range of the RI is 1 and 2. Therefore, a quantity of values of CSI associated with each reference signal resource is Q=2*4=8. A specific value of each piece of information in a first association relationship is as follows:

Z indicated by first information is equal to 4.
Y indicated by second information is equal to ½.
X indicated by third information is equal to 2.
L indicated by fourth information is equal to 1.

FIG. 3 is still used as an example. The 32 random access time-frequency resource units are successively R 00, R 01, R 02, R 03, R 10, R 11, . . . , and R 73 first in ascending order of frequency domain indexes and then in ascending order of time domain indexes based on the first association relationship.

With reference to the foregoing second association relationship, for a finally determined association relationship between the eight reference signal resources and the 32 random access time-frequency resource units, refer to FIG. 4.

Further, with reference to the foregoing example, an association relationship between CSI associated with each reference signal resource and a random access preamble may be that shown in Table 4. An association order used in this embodiment is that a reference signal resource, CSI associated with each reference signal resource, a random access time-frequency unit, and a random access preamble are associated first in ascending order of CQIs corresponding to one RI of one reference signal resource, further in ascending order of indexes of reference signal resources, and then in ascending order of RIs of the reference signal resource.

TABLE 4

| Reference signal resource | CSI associated with the reference signal resource | Random access preamble associated with the CSI | Random access time-frequency resource unit |
|---|---|---|---|
| SSB 1 | RI = 1, CQI 0 | Preamble 0 and preamble 1 | R 00 |
| | RI = 1, CQI 1 | Preamble 2 and preamble 3 | R 00 |
| | RI = 1, CQI 2 | Preamble 0 and preamble 1 | R 01 |
| | RI = 1, CQI 3 | Preamble 2 and preamble 3 | R 01 |
| SSB 2 | RI = 1, CQI 0 | Preamble 0 and preamble 1 | R 02 |
| | RI = 1, CQI 1 | Preamble 2 and preamble 3 | R 02 |
| | RI = 1, CQI 2 | Preamble 0 and preamble 1 | R 03 |
| | RI = 1, CQI 3 | Preamble 2 and preamble 3 | R 03 |
| SSB 3 | RI = 1, CQI 0 | Preamble 0 and preamble 1 | R 10 |
| | RI = 1, CQI 1 | Preamble 2 and preamble 3 | R 10 |
| | RI = 1, CQI 2 | Preamble 0 and preamble 1 | R 11 |
| | RI = 1, CQI 3 | Preamble 2 and preamble 3 | R 11 |
| SSB 4 | RI = 1, CQI 0 | Preamble 0 and preamble 1 | R 12 |
| | RI = 1, CQI 1 | Preamble 2 and preamble 3 | R 12 |
| | RI = 1, CQI 2 | Preamble 0 and preamble 1 | R 13 |
| | RI = 1, CQI 3 | Preamble 2 and preamble 3 | R 13 |
| SSB 5 | RI = 1, CQI 0 | Preamble 0 and preamble 1 | R 20 |
| | RI = 1, CQI 1 | Preamble 2 and preamble 3 | R 20 |
| | RI = 1, CQI 2 | Preamble 0 and preamble 1 | R 21 |
| | RI = 1, CQI 3 | Preamble 2 and preamble 3 | R 21 |
| SSB 6 | RI = 1, CQI 0 | Preamble 0 and preamble 1 | R 22 |
| | RI = 1, CQI 1 | Preamble 2 and preamble 3 | R 22 |
| | RI = 1, CQI 2 | Preamble 0 and preamble 1 | R 23 |
| | RI = 1, CQI 3 | Preamble 2 and preamble 3 | R 23 |
| SSB 7 | RI = 1, CQI 0 | Preamble 0 and preamble 1 | R 30 |
| | RI = 1, CQI 1 | Preamble 2 and preamble 3 | R 30 |
| | RI = 1, CQI 2 | Preamble 0 and preamble 1 | R 31 |
| | RI = 1, CQI 3 | Preamble 2 and preamble 3 | R 31 |
| SSB 8 | RI = 1, CQI 0 | Preamble 0 and preamble 1 | R 32 |
| | RI = 1, CQI 1 | Preamble 2 and preamble 3 | R 32 |
| | RI = 1, CQI 2 | Preamble 0 and preamble 1 | R 33 |
| | RI = 1, CQI 3 | Preamble 2 and preamble 3 | R 33 |
| SSB 1 | RI = 2, CQI 0 | Preamble 0 and preamble 1 | R 40 |
| | RI = 2, CQI 1 | Preamble 2 and preamble 3 | R 40 |
| | RI = 2, CQI 2 | Preamble 0 and preamble 1 | R 41 |
| | RI = 2, CQI 3 | Preamble 2 and preamble 3 | R 41 |
| SSB 2 | RI = 2, CQI 0 | Preamble 0 and preamble 1 | R 42 |
| | RI = 2, CQI 1 | Preamble 2 and preamble 3 | R 42 |
| | RI = 2, CQI 2 | Preamble 0 and preamble 1 | R 43 |
| | RI = 2, CQI 3 | Preamble 2 and preamble 3 | R 43 |
| SSB 3 | RI = 2, CQI 0 | Preamble 0 and preamble 1 | R 50 |
| | RI = 2, CQI 1 | Preamble 2 and preamble 3 | R 50 |
| | RI = 2, CQI 2 | Preamble 0 and preamble 1 | R 51 |
| | RI = 2, CQI 3 | Preamble 2 and preamble 3 | R 51 |
| SSB 4 | RI = 2, CQI 0 | Preamble 0 and preamble 1 | R 52 |
| | RI = 2, CQI 1 | Preamble 2 and preamble 3 | R 52 |
| | RI = 2, CQI 2 | Preamble 0 and preamble 1 | R 53 |
| | RI = 2, CQI 3 | Preamble 2 and preamble 3 | R 53 |
| SSB 5 | RI = 2, CQI 0 | Preamble 0 and preamble 1 | R 60 |
| | RI = 2, CQI 1 | Preamble 2 and preamble 3 | R 60 |
| | RI = 2, CQI 2 | Preamble 0 and preamble 1 | R 61 |
| | RI = 2, CQI 3 | Preamble 2 and preamble 3 | R 61 |
| SSB 6 | RI = 2, CQI 0 | Preamble 0 and preamble 1 | R 62 |
| | RI = 2, CQI 1 | Preamble 2 and preamble 3 | R 62 |
| | RI = 2, CQI 2 | Preamble 0 and preamble 1 | R 63 |
| | RI = 2, CQI 3 | Preamble 2 and preamble 3 | R 63 |
| SSB 7 | RI = 2, CQI 0 | Preamble 0 and preamble 1 | R 70 |
| | RI = 2, CQI 1 | Preamble 2 and preamble 3 | R 70 |
| | RI = 2, CQI 2 | Preamble 0 and preamble 1 | R 71 |
| | RI = 2, CQI 3 | Preamble 2 and preamble 3 | R 71 |
| SSB 8 | RI = 2, CQI 0 | Preamble 0 and preamble 1 | R 72 |
| | RI = 2, CQI 1 | Preamble 2 and preamble 3 | R 72 |
| | RI = 2, CQI 2 | Preamble 0 and preamble 1 | R 73 |
| | RI = 2, CQI 3 | Preamble 2 and preamble 3 | R 73 |

Figure 7:
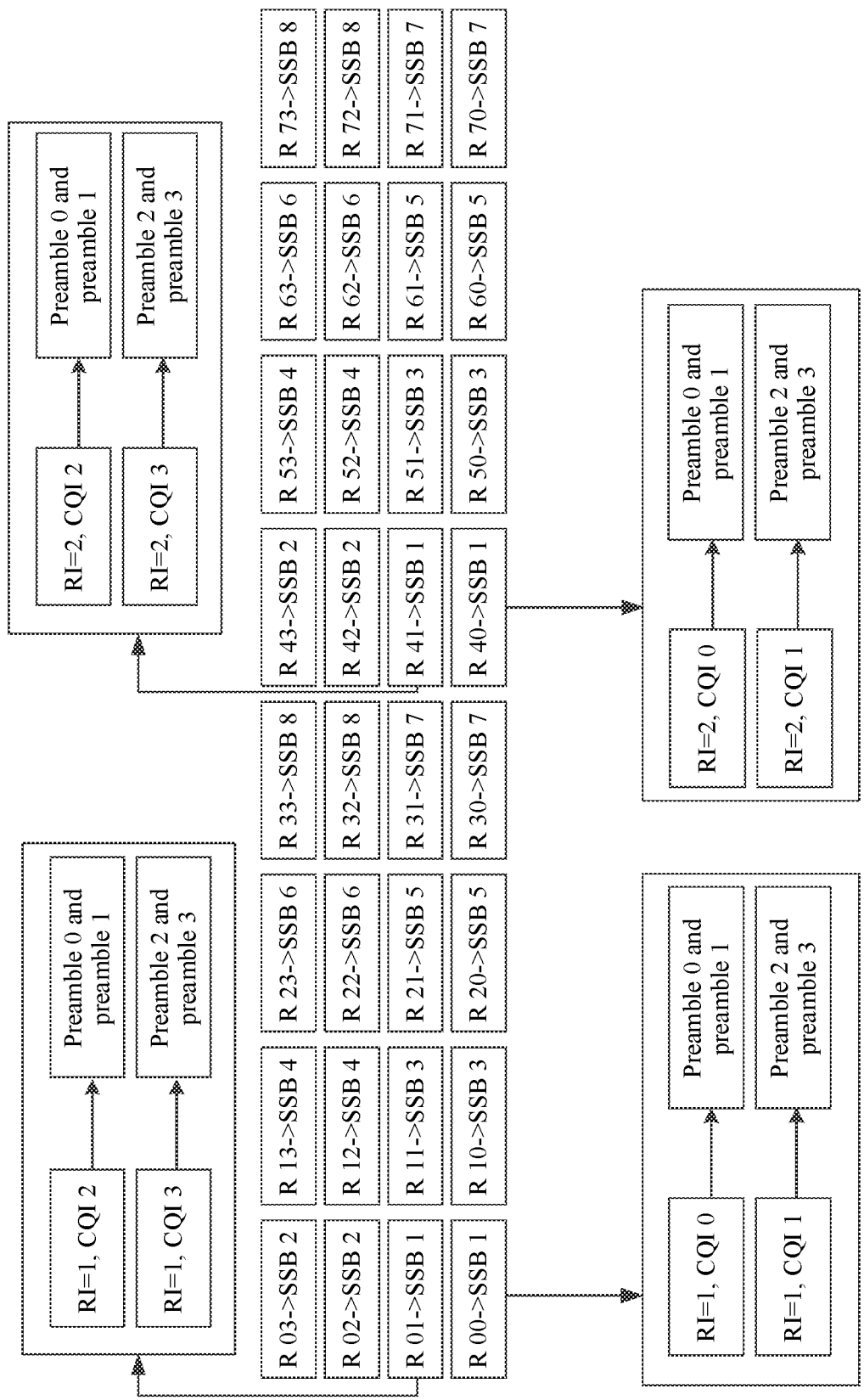
FIG. 7 is a schematic diagram of association according to an embodiment of this application.

With reference to Table 4 and FIG. 4, as shown in FIG. 7, FIG. 7 merely illustrates reference signal resources, random access preambles, and values of CSI that are separately associated with R 00, R 01, R 40, and R 41, and details are not described in other cases.

With reference to the foregoing descriptions, when receiving the eight reference signal resources, a terminal device determines that channel quality corresponding to the reference signal resource SSB 1 is optimal, and selects the reference signal resource SSB 1. If CSI determined by the terminal device based on the reference signal resource SSB 1 is RI=2 and CQI=2, in this case, with reference to FIG. 4 and Table 4, a random access time-frequency resource unit selected by the terminal device is R 41, and a selected random access preamble is the preamble 0 or the preamble 1. Therefore, the terminal device may send the preamble 0 or the preamble 1 to the network device by using the random access time-frequency resource unit R 41. Correspondingly, when a random access preamble received by the network device by using the random access time-frequency resource unit R 41 is the preamble 0 or the preamble 1, the network device may determine that the terminal device selects the reference signal resource SSB 1 and CSI of the reference signal resource SSB 1 is RI=2 and CQI=2. Other cases may be deduced by analogy, and details are not described again. Optionally, that the foregoing optimal channel quality may be a maximum throughput calculated by the terminal device, a maximum signal-to-noise ratio, a maximum reference signal received power, or the like. This is not limited. Optionally, no order is limited to that the terminal device determines a reference signal resource and determines CSI of the reference signal resource, and the reference signal resource and the CSI of the reference signal resource may be determined together.

Embodiment 5

A network device sends eight reference signal resources. The eight reference signal resources are associated with R=32 random access time-frequency resource units, and the eight reference signal resources are associated with N=32 random access preambles. The eight reference signal resources are successively an SSB 1 to an SSB 8 in ascending order of indexes. CSI includes an RI and a CQI. A value range of the CQI is a CQI 0 to a CQI 3, and a value range of the RI is 1 and 2. Therefore, a quantity of values of CSI associated with each reference signal resource is Q=2*4=8. A specific value of each piece of information in a first association relationship is as follows:

Z indicated by first information is equal to 4.
Y indicated by second information is equal to ½.
X indicated by third information is equal to 4.
L indicated by fourth information is equal to 1.
FIG. 3 is still used as an example. The 32 random access time-frequency resource units are successively R 00, R 01, R 02, R 03, R 10, R 11, . . . , and R 73 first in ascending order of frequency domain indexes and then in ascending order of time domain indexes based on the first association relationship.

With reference to the foregoing second association relationship, for a finally determined association relationship between the eight reference signal resources and the 32 random access time-frequency resource units, refer to FIG. 4. An association order used in this embodiment is that a reference signal resource, CSI associated with each reference signal resource, a random access time-frequency unit, and a random access preamble are associated first in ascending order of CQIs corresponding to one RI of one reference signal resource, further in ascending order of indexes of reference signal resources, and then in ascending order of RIs of the reference signal resource.

Further, with reference to the foregoing example, an association relationship between CSI associated with each reference signal resource and a random access preamble may be that shown in Table 5.

TABLE 5

| Reference signal resource | CSI associated with the reference signal resource | Random access preamble associated with the CSI | Random access time-frequency resource unit |
|---|---|---|---|
| SSB 1 | RI = 1, CQI 0 | Preamble 0 | R 00 and R 01 |
|  | RI = 1, CQI 1 | Preamble 1 | R 00 and R 01 |
|  | RI = 1, CQI 2 | Preamble 2 | R 00 and R 01 |
|  | RI = 1, CQI 3 | Preamble 3 | R 00 and R 01 |
| SSB 2 | RI = 1, CQI 0 | Preamble 0 | R 02 and R 03 |
|  | RI = 1, CQI 1 | Preamble 1 | R 02 and R 03 |
|  | RI = 1, CQI 2 | Preamble 2 | R 02 and R 03 |
|  | RI = 1, CQI 3 | Preamble 3 | R 02 and R 03 |
| SSB 3 | RI = 1, CQI 0 | Preamble 0 | R 10 and R 11 |
|  | RI = 1, CQI 1 | Preamble 1 | R 10 and R 11 |
|  | RI = 1, CQI 2 | Preamble 2 | R 10 and R 11 |
|  | RI = 1, CQI 3 | Preamble 3 | R 10 and R 11 |
| SSB 4 | RI = 1, CQI 0 | Preamble 0 | R 12 and R 13 |
|  | RI = 1, CQI 1 | Preamble 1 | R 12 and R 13 |
|  | RI = 1, CQI 2 | Preamble 2 | R 12 and R 13 |
|  | RI = 1, CQI 3 | Preamble 3 | R 12 and R 13 |
| SSB 5 | RI = 1, CQI 0 | Preamble 0 | R 20 and R 21 |
|  | RI = 1, CQI 1 | Preamble 1 | R 20 and R 21 |
|  | RI = 1, CQI 2 | Preamble 2 | R 20 and R 21 |
|  | RI = 1, CQI 3 | Preamble 3 | R 20 and R 21 |
| SSB 6 | RI = 1, CQI 0 | Preamble 0 | R 22 and R 23 |
|  | RI = 1, CQI 1 | Preamble 1 | R 22 and R 23 |
|  | RI = 1, CQI 2 | Preamble 2 | R 22 and R 23 |
|  | RI = 1, CQI 3 | Preamble 3 | R 22 and R 23 |
| SSB 7 | RI = 1, CQI 0 | Preamble 0 | R 30 and R 31 |
|  | RI = 1, CQI 1 | Preamble 1 | R 30 and R 31 |
|  | RI = 1, CQI 2 | Preamble 2 | R 30 and R 31 |
|  | RI = 1, CQI 3 | Preamble 3 | R 30 and R 31 |
| SSB 8 | RI = 1, CQI 0 | Preamble 0 | R 32 and R 33 |
|  | RI = 1, CQI 1 | Preamble 1 | R 32 and R 33 |
|  | RI = 1, CQI 2 | Preamble 2 | R 32 and R 33 |
|  | RI = 1, CQI 3 | Preamble 3 | R 32 and R 33 |
| SSB 1 | RI = 2, CQI 0 | Preamble 0 | R 40 and R 41 |
|  | RI = 2, CQI 1 | Preamble 1 | R 40 and R 41 |
|  | RI = 2, CQI 2 | Preamble 2 | R 40 and R 41 |
|  | RI = 2, CQI 3 | Preamble 3 | R 40 and R 41 |
| SSB 2 | RI = 2, CQI 0 | Preamble 0 | R 42 and R 43 |
|  | RI = 2, CQI 1 | Preamble 1 | R 42 and R 43 |
|  | RI = 2, CQI 2 | Preamble 2 | R 42 and R 43 |
|  | RI = 2, CQI 3 | Preamble 3 | R 42 and R 43 |
| SSB 3 | RI = 2, CQI 0 | Preamble 0 | R 50 and R 51 |
|  | RI = 2, CQI 1 | Preamble 1 | R 50 and R 51 |
|  | RI = 2, CQI 2 | Preamble 2 | R 50 and R 51 |
|  | RI = 2, CQI 3 | Preamble 3 | R 50 and R 51 |
| SSB 4 | RI = 2, CQI 0 | Preamble 0 | R 52 and R 53 |
|  | RI = 2, CQI 1 | Preamble 1 | R 52 and R 53 |
|  | RI = 2, CQI 2 | Preamble 2 | R 52 and R 53 |
|  | RI = 2, CQI 3 | Preamble 3 | R 52 and R 53 |
| SSB 5 | RI = 2, CQI 0 | Preamble 0 | R 60 and R 61 |
|  | RI = 2, CQI 1 | Preamble 1 | R 60 and R 61 |
|  | RI = 2, CQI 2 | Preamble 2 | R 60 and R 61 |
|  | RI = 2, CQI 3 | Preamble 3 | R 60 and R 61 |
| SSB 6 | RI = 2, CQI 0 | Preamble 0 | R 62 and R 63 |
|  | RI = 2, CQI 1 | Preamble 1 | R 62 and R 63 |
|  | RI = 2, CQI 2 | Preamble 2 | R 62 and R 63 |
|  | RI = 2, CQI 3 | Preamble 3 | R 62 and R 63 |
| SSB 7 | RI = 2, CQI 0 | Preamble 0 | R 70 and R 71 |
|  | RI = 2, CQI 1 | Preamble 1 | R 70 and R 71 |
|  | RI = 2, CQI 2 | Preamble 2 | R 70 and R 71 |
|  | RI = 2, CQI 3 | Preamble 3 | R 70 and R 71 |
| SSB 8 | RI = 2, CQI 0 | Preamble 0 | R 72 and R 73 |
|  | RI = 2, CQI 1 | Preamble 1 | R 72 and R 73 |
|  | RI = 2, CQI 2 | Preamble 2 | R 72 and R 73 |
|  | RI = 2, CQI 3 | Preamble 3 | R 72 and R 73 |

Figure 8:
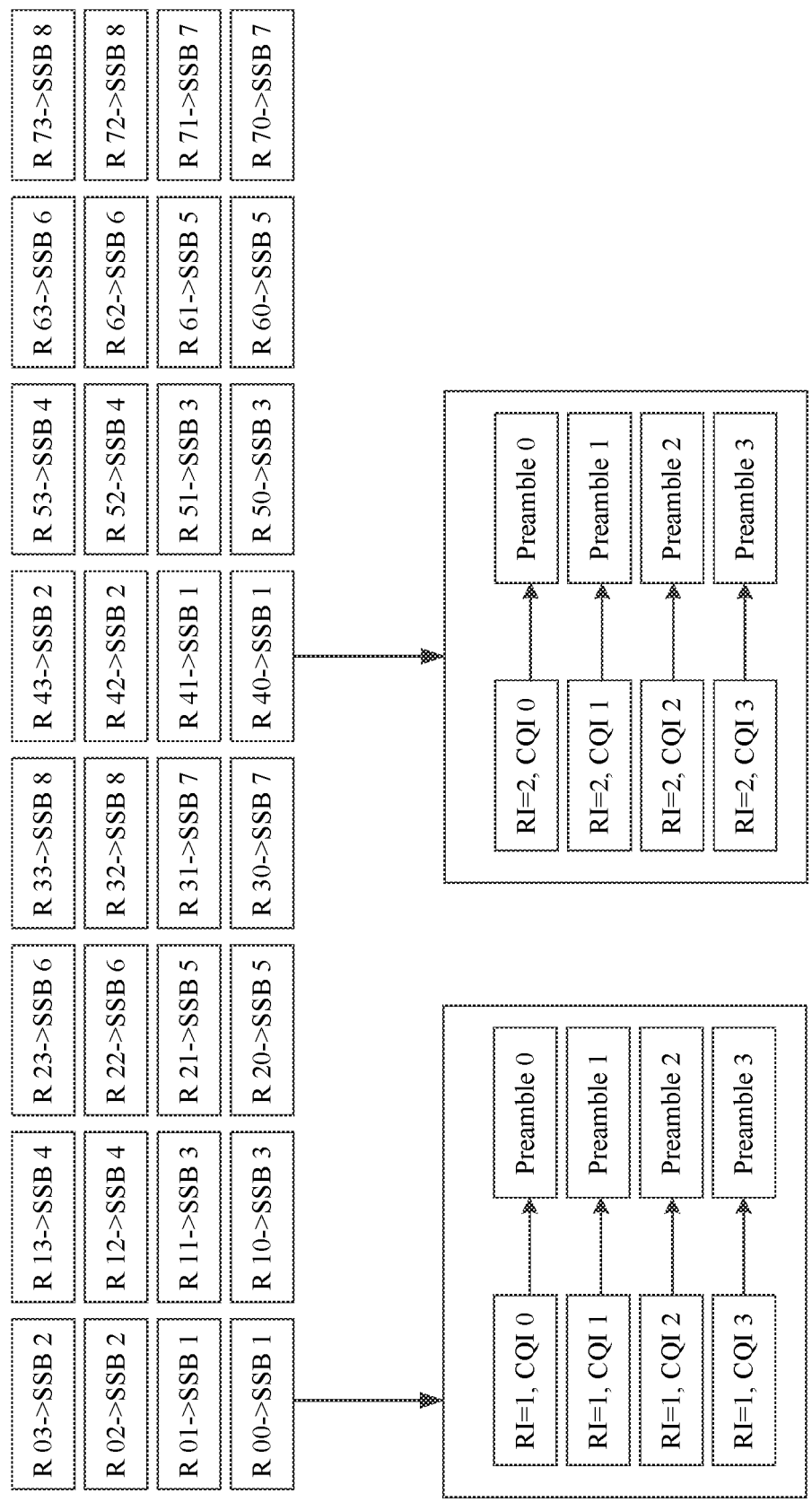
FIG. 8 is a schematic diagram of association according to an embodiment of this application.

With reference to Table 5, as shown in FIG. 8, FIG. 8 merely illustrates reference signal resources, random access preambles, and values of CSI that are separately associated with R 00 and R 40, and details are not described in other cases.

With reference to the foregoing descriptions, when receiving the eight reference signal resources, a terminal device determines that signal quality corresponding to the reference signal resource SSB 1 is optimal, and selects the reference signal resource SSB 1. If CSI determined by the terminal device based on the reference signal resource SSB 1 is RI=2 and CQI=2, in this case, with reference to FIG. 4 and Table 4, a random access time-frequency resource unit selected by the terminal device is R 40 or R 41, and a selected random access preamble is the preamble 2. Therefore, the terminal device may send the preamble 2 to the network device by using the random access time-frequency resource unit R 40 or R 41. Correspondingly, when a random access preamble received by the network device by using the random access time-frequency resource unit R 40 or R 41 is the preamble 2, the network device may determine that the terminal device selects the reference signal resource SSB 1 and CSI of the reference signal resource SSB 1 is RI=2 and CQI=2. Other cases may be deduced by analogy, and details are not described again.

Embodiment 6

A network device sends eight reference signal resources. The eight reference signal resources are associated with R=32 random access time-frequency resource units, and the eight reference signal resources are associated with N=64 random access preambles. The eight reference signal resources are successively an SSB 1 to an SSB 8 in ascending order of indexes. CSI includes an RI and a CQI. A value range of the CQI is 0 and 1, that is, Q1=2, and a value range of the RI is 1 and 2, that is, Q2=2. Therefore, a quantity of values of CSI associated with each reference signal resource is Q=2*2=4. A specific value of each piece of information in a first association relationship is as follows:

Z indicated by first information is equal to 4.
Y indicated by second information is equal to ½.
X indicated by third information is equal to 16.
L indicated by fourth information is equal to 8.

FIG. 3 is still used as an example. The 32 random access time-frequency resource units are successively R 00, R 01, R 02, R 03, R 10, R 11, . . . , and R 73 first in ascending order of frequency domain indexes and then in ascending order of time domain indexes based on the first association relationship.

Figure 9:
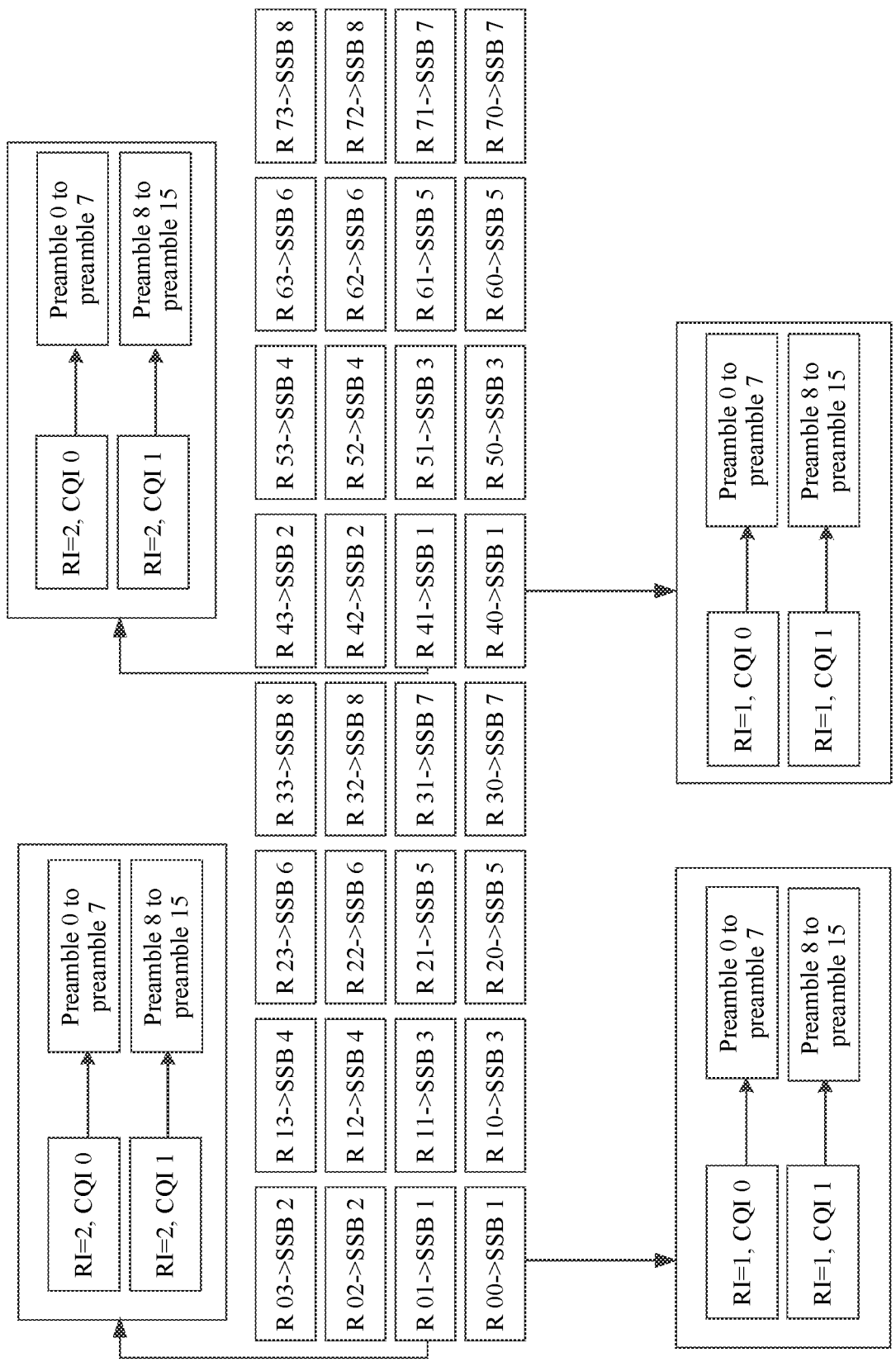
FIG. 9 is a schematic diagram of association according to an embodiment of this application.

With reference to the foregoing second association relationship, for a finally determined association relationship between the eight reference signal resources and the 32 random access time-frequency resource units, refer to FIG. 9. An association order used in this embodiment is that a reference signal resource, CSI associated with each reference signal resource, a random access time-frequency unit, and a random access preamble are associated first in ascending order of CQIs corresponding to one RI of one reference signal resource, further in ascending order of RIs of the reference signal resource, and then in ascending order of indexes of reference signal resources.

Further, according to L=8, Q=4, N=64, and X=16, it can be learned that X'=L*Q/X=2, T=Q/X'=2, and G=1. That is, four CSI values of one SSB are mapped to X'=2 ROs. The SSB may be mapped to 1/Y=2 ROs. Therefore, in the two ROs, an $(i=0)^{th}$ RO is associated with a $0^{th}$ CSI value (which is referred to as a CSI 0 below) and a $1^{st}$ CSI value (a CSI 1) of the SSB, and $(i=1)^{th}$ RO associated with the SSB is associated with a second CSI value (which is referred to as a CSI 2 below) and a third CSI value (a CSI 3) of the SSB. The CSI 0 corresponds to RI=1 and the CQI 0, the CSI 1 corresponds to RI=1 and the CQI 1, the CSI 2 corresponds to RI=2 and CQI 0, and the CSI 3 corresponds to RI=2 and the CQI 1. L random access preambles associated with the CSI 0 and the CSI 2 are a preamble 0 to a preamble 7, and L random access preambles associated with the CSI 1 and the CSI 3 are a preamble 8 to a preamble 15.

Further, with reference to the foregoing example, in Embodiment 6, an association relationship between CSI associated with each reference signal resource and a random access preamble may be that shown in Table 6.

TABLE 6

| Reference signal resource | CSI associated with the reference signal resource | Random access preamble associated with the CSI | Random access time-frequency resource unit |
|---|---|---|---|
| SSB 1 | RI = 1, CQI 0 | Preamble 0 to preamble 7 | R 00 |
|  | RI = 1, CQI 1 | Preamble 8 to preamble 15 | R 00 |
|  | RI = 2, CQI 0 | Preamble 0 to preamble 7 | R 01 |
|  | RI = 2, CQI 1 | Preamble 8 to preamble 15 | R 01 |
| SSB 2 | RI = 1, CQI 0 | Preamble 0 to preamble 7 | R 02 |
|  | RI = 1, CQI 1 | Preamble 8 to preamble 15 | R 02 |
|  | RI = 2, CQI 0 | Preamble 0 to preamble 7 | R 03 |
|  | RI = 2, CQI 1 | Preamble 8 to preamble 15 | R 03 |
| SSB 3 | RI = 1, CQI 0 | Preamble 0 to preamble 7 | R 10 |
|  | RI = 1, CQI 1 | Preamble 8 to preamble 15 | R 10 |
|  | RI = 2, CQI 0 | Preamble 0 to preamble 7 | R 11 |
|  | RI = 2, CQI 1 | Preamble 8 to preamble 15 | R 11 |
| SSB 4 | RI = 1, CQI 0 | Preamble 0 to preamble 7 | R 12 |
|  | RI = 1, CQI 1 | Preamble 8 to preamble 15 | R 12 |
|  | RI = 2, CQI 0 | Preamble 0 to preamble 7 | R 13 |
|  | RI = 2, CQI 1 | Preamble 8 to preamble 15 | R 13 |
| SSB 5 | RI = 1, CQI 0 | Preamble 0 to preamble 7 | R 20 |
|  | RI = 1, CQI 1 | Preamble 8 to preamble 15 | R 20 |
|  | RI = 2, CQI 0 | Preamble 0 to preamble 7 | R 21 |
|  | RI = 2, CQI 1 | Preamble 8 to preamble 15 | R 21 |
| SSB 6 | RI = 1, CQI 0 | Preamble 0 to preamble 7 | R 22 |
|  | RI = 1, CQI 1 | Preamble 8 to preamble 15 | R 22 |
|  | RI = 2, CQI 0 | Preamble 0 to preamble 7 | R 23 |
|  | RI = 2, CQI 1 | Preamble 8 to preamble 15 | R 23 |
| SSB 7 | RI = 1, CQI 0 | Preamble 0 to preamble 7 | R 30 |
|  | RI = 1, CQI 1 | Preamble 8 to preamble 15 | R 30 |
|  | RI = 2, CQI 0 | Preamble 0 to preamble 7 | R 31 |
|  | RI = 2, CQI 1 | Preamble 8 to preamble 15 | R 31 |
| SSB 8 | RI = 1, CQI 0 | Preamble 0 to preamble 7 | R 32 |
|  | RI = 1, CQI 1 | Preamble 8 to preamble 15 | R 32 |
|  | RI = 2, CQI 0 | Preamble 0 to preamble 7 | R 33 |
|  | RI = 2, CQI 1 | Preamble 8 to preamble 15 | R 33 |
| SSB 1 | RI = 1, CQI 0 | Preamble 0 to preamble 7 | R 40 |
|  | RI = 1, CQI 1 | Preamble 8 to preamble 15 | R 40 |
|  | RI = 2, CQI 0 | Preamble 0 to preamble 7 | R 41 |
|  | RI = 2, CQI 1 | Preamble 8 to preamble 15 | R 41 |
| SSB 2 | RI = 1, CQI 0 | Preamble 0 to preamble 7 | R 42 |
|  | RI = 1, CQI 1 | Preamble 8 to preamble 15 | R 42 |
|  | RI = 2, CQI 0 | Preamble 0 to preamble 7 | R 43 |
|  | RI = 2, CQI 1 | Preamble 8 to preamble 15 | R 43 |
| SSB 3 | RI = 1, CQI 0 | Preamble 0 to preamble 7 | R 50 |
|  | RI = 1, CQI 1 | Preamble 8 to preamble 15 | R 50 |
|  | RI = 2, CQI 0 | Preamble 0 to preamble 7 | R 51 |
|  | RI = 2, CQI 1 | Preamble 8 to preamble 15 | R 51 |
| SSB 4 | RI = 1, CQI 0 | Preamble 0 to preamble 7 | R 52 |
|  | RI = 1, CQI 1 | Preamble 8 to preamble 15 | R 52 |
|  | RI = 2, CQI 0 | Preamble 0 to preamble 7 | R 53 |
|  | RI = 2, CQI 1 | Preamble 8 to preamble 15 | R 53 |
| SSB 5 | RI = 1, CQI 0 | Preamble 0 to preamble 7 | R 60 |
|  | RI = 1, CQI 1 | Preamble 8 to preamble 15 | R 60 |
|  | RI = 2, CQI 0 | Preamble 0 to preamble 7 | R 61 |
|  | RI = 2, CQI 1 | Preamble 8 to preamble 15 | R 61 |
| SSB 6 | RI = 1, CQI 0 | Preamble 0 to preamble 7 | R 62 |
|  | RI = 1, CQI 1 | Preamble 8 to preamble 15 | R 62 |
|  | RI = 2, CQI 0 | Preamble 0 to preamble 7 | R 63 |
|  | RI = 2, CQI 1 | Preamble 8 to preamble 15 | R 63 |
| SSB 7 | RI = 1, CQI 0 | Preamble 0 to preamble 7 | R 70 |
|  | RI = 1, CQI 1 | Preamble 8 to preamble 15 | R 70 |
|  | RI = 2, CQI 0 | Preamble 0 to preamble 7 | R 71 |
|  | RI = 2, CQI 1 | Preamble 8 to preamble 15 | R 71 |
| SSB 8 | RI = 1, CQI 0 | Preamble 0 to preamble 7 | R 72 |
|  | RI = 1, CQI 1 | Preamble 8 to preamble 15 | R 72 |
|  | RI = 2, CQI 0 | Preamble 0 to preamble 7 | R 73 |
|  | RI = 2, CQI 1 | Preamble 8 to preamble 15 | R 73 |

The foregoing is merely an example. When X, L, Y, and Q have different values, there may be other cases. For other cases, refer to the foregoing embodiments for derivation. Examples are not described herein one by one.

Figure 10:
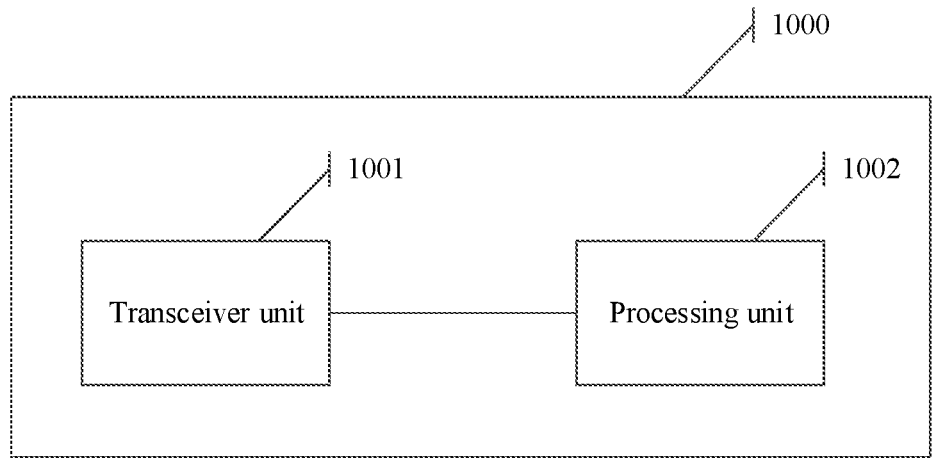
FIG. 10 is a schematic diagram of a structure of a communication apparatus according to an embodiment of this application.

Based on the foregoing content and a same concept, this application provides a communication apparatus, configured to perform any solution of the network device in the foregoing method procedures. FIG. 10 is an example of a schematic diagram of a structure of a communication apparatus according to this application. For example, the communication apparatus 1000 in this example may be a network device, and may perform the solution correspondingly performed by the network device in FIG. 2. As shown in FIG. 10, the communication apparatus 1000 includes a transceiver unit 1001 and a processing unit 1002.

The transceiver unit 1001 is configured to: send K reference signal resources, where K is an integer greater than 0; and receive a first random access preamble in a first random access time-frequency resource unit.

The processing unit 1002 is configured to determine indexes of S reference signal resources and first channel state information CSI of the S reference signal resources based on the first random access preamble and the first random access time-frequency resource unit, where the S reference signal resources are associated with at least one of the first random access time-frequency resource unit and the first random access preamble, the first CSI is associated with at least one of the first random access time-frequency resource unit and the first random access preamble, the S reference signal resources are reference signal resources in the K reference signal resources, and S is an integer greater than 0 and less than or equal to K.

In a possible implementation, the processing unit 1002 is specifically configured to:
determine, based on a first association relationship and a second association relationship, the S reference signal resources and the first CSI that are associated with the first random access time-frequency resource unit and the first random access preamble, where
the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:
first information, where the first information is used to indicate a quantity Z of random access time-frequency resource units in a same time unit;
second information, where the second information is used to indicate a quantity Y of reference signal resources associated with one of the Z random access time-frequency resource units;
third information, where the third information is used to indicate a quantity X of random access preambles associated with one of the Y reference signal resources;
fourth information, where the fourth information is used to indicate a quantity L of random access preambles associated with any CSI value of one of the Y reference signal resources, and L is a positive integer; and
fifth information, where the fifth information is used to indicate a quantity Q of CSI values of one of the Y reference signal resources, and Q is a positive integer, where
Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

$X*1/Y \geq L*Q$, and $X*\max\{Y,1\} \leq N$, where $\max\{\ \}$ is an operation of obtaining a maximum value.

In a possible implementation, the third information, the fourth information, and the fifth information meet the following constraint condition:

$X = LQ$ or $X = \begin{cases} LQY, Y \leq 1 \\ LQ, Y > 1 \end{cases}$.

In a possible implementation, the K reference signal resources are associated with R random access time-frequency resource units, CSI of one of the K reference signal resources has Q values, and K reference signal resources are associated with N random access preambles; and
the second association relationship includes at least one of the following:
the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and
the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;
when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or
when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

Figure 11:
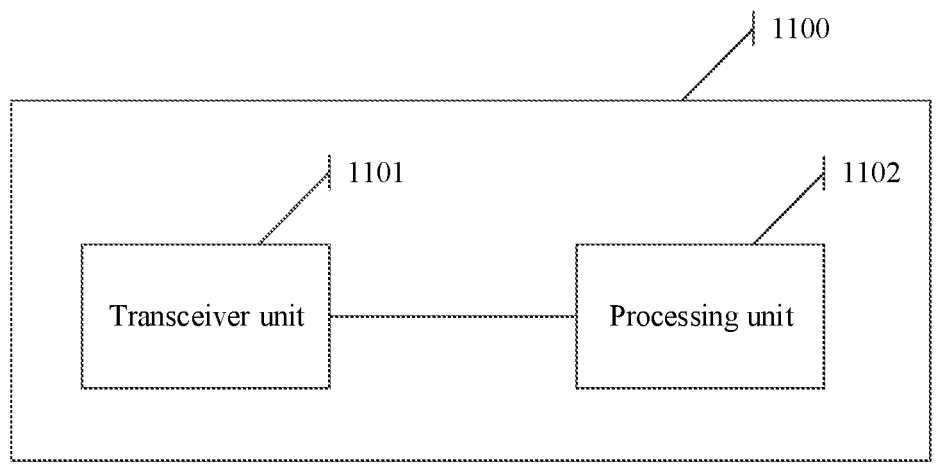
FIG. 11 is a schematic diagram of a structure of a communication apparatus according to an embodiment of this application.

Based on the foregoing content and a same concept, this application provides a communication apparatus, configured to perform any solution of the terminal device in the foregoing method procedures. FIG. 11 is an example of a schematic diagram of a structure of a communication apparatus according to this application. For example, the communication apparatus 1100 in this example may be a terminal device, and may perform the solution correspondingly performed by the terminal device in FIG. 2. As shown in FIG. 11, the communication apparatus 1100 includes a transceiver unit 1101 and a processing unit 1102.

The transceiver unit 1101 is configured to receive K reference signal resources, where K is an integer greater than 0.

The processing unit 1102 is configured to: determine S reference signal resources in the K reference signal resources, and determine first CSI of the S reference signal resources, where S is an integer greater than 0 and less than or equal to K.

The transceiver unit 1101 is configured to send a first random access preamble in a first random access time-frequency resource unit, where
at least one of the first random access time-frequency resource unit and the first random access preamble is associated with the S reference signal resources, at least one of the first random access time-frequency resource unit and the first random access preamble is associated with the first CSI of the S reference signal resources, and S is an integer greater than 0 and less than or equal to K.

In a possible implementation, the processing unit 1102 is specifically configured to:

determine, based on a first association relationship and a second association relationship, the first random access time-frequency resource unit and the first random access preamble that are associated with the S reference signal resources and the first CSI, where the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:

first information, where the first information is used to indicate a quantity Z of random access time-frequency resource units in a same time unit;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

$X*1/Y \geq L*Q$, and $X*\max\{Y,1\} \leq N$, where max{ } is an operation of obtaining a maximum value.

In a possible implementation, the third information, the fourth information, and the fifth information meet the following constraint condition:

$X = LQ$ or $X = \begin{cases} LQY, Y \leq 1 \\ LQ, Y > 1 \end{cases}$.

In a possible implementation, the K reference signal resources are associated with R random access time-frequency resource units, CSI of one of the K reference signal resources has Q values, and the K reference signal resources are associated with N random access preambles; and the second association relationship includes at least one of the following:

the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;

when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

Figure 12:
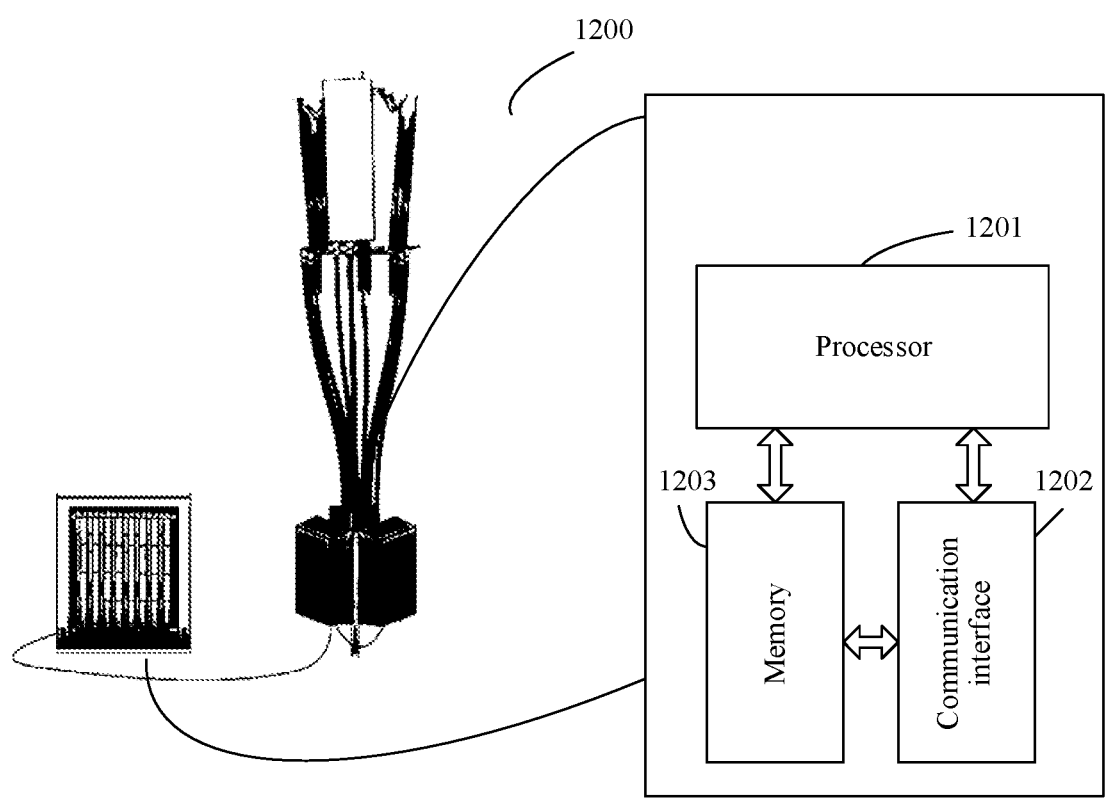
FIG. 12 is a schematic diagram of a structure of a communication apparatus according to an embodiment of this application.

Refer to FIG. 12. An embodiment of this application further provides a communication apparatus, configured to perform behaviors and functions of the network device in the foregoing method embodiments. For ease of description, the apparatus is briefly referred to as a network device in the following. Specifically, FIG. 12 shows only main components of the network device. Refer to FIG. 12. The network device 1200 includes a processor 1201, a communication interface 1202, and a memory 1203. The apparatus shown in FIG. 12 may be a hardware implementation of the apparatus shown in FIG. 10.

The communication interface 1202 is configured to: send K reference signal resources, where K is an integer greater than 0; and receive a first random access preamble in a first random access time-frequency resource unit.

The processor 1201 is configured to determine indexes of S reference signal resources and first channel state information CSI of the S reference signal resources based on the first random access preamble and the first random access time-frequency resource unit, where the S reference signal resources are associated with at least one of the first random access time-frequency resource unit and the first random access preamble, the first CSI is associated with at least one of the first random access time-frequency resource unit and the first random access preamble, the S reference signal resources are reference signal resources in the K reference signal resources, and S is an integer greater than 0 and less than or equal to K.

In a possible implementation, the processor 1201 is specifically configured to:

determine, based on a first association relationship and a second association relationship, the S reference signal resources and the first CSI that are associated with the first random access time-frequency resource unit and the first random access preamble, where the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:

first information, where the first information is used to indicate a quantity Z of random access time-frequency resource units in a same time unit;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

$X*1/Y \geq L*Q$, and $X*\max\{Y,1\} \leq N$, where max{ } is an operation of obtaining a maximum value.

In a possible implementation, the third information, the fourth information, and the fifth information meet the following constraint condition:

$$X = LQ \text{ or}$$
$$X = \begin{cases} LQY, Y \leq 1 \\ LQ, Y > 1 \end{cases}.$$

In a possible implementation, the K reference signal resources are associated with R random access time-frequency resource units, CSI of one of the K reference signal resources has Q values, and the K reference signal resources are associated with N random access preambles; and the second association relationship includes at least one of the following:

the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;

when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

Figure 13:
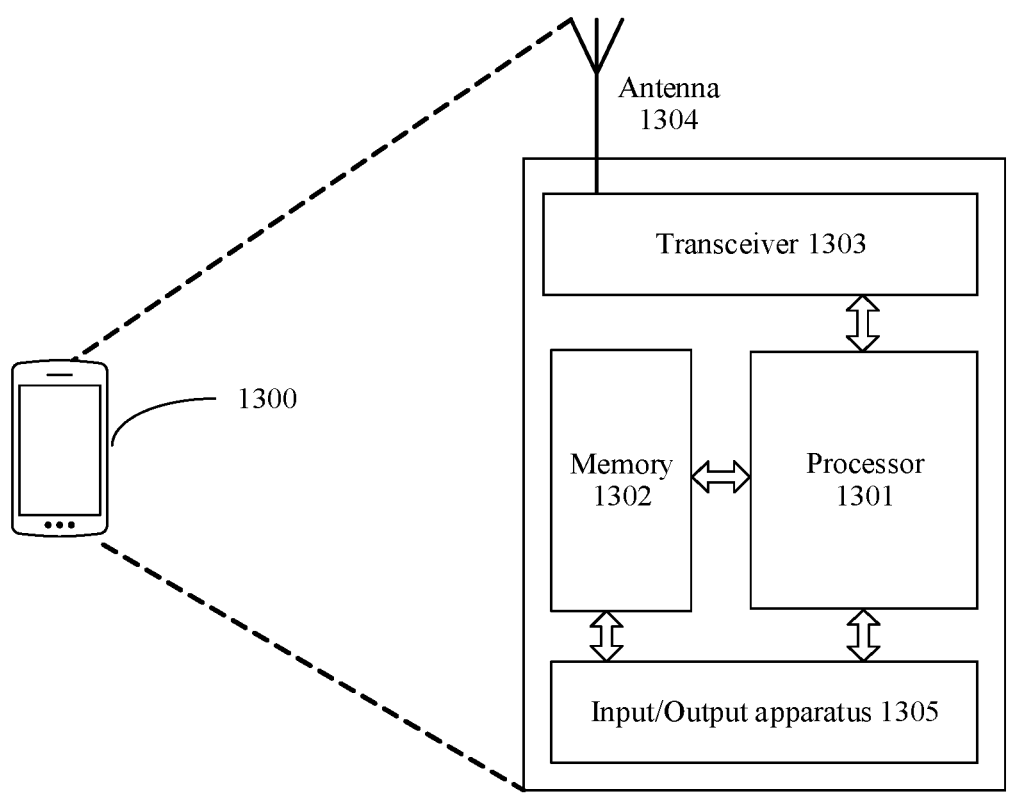
FIG. 13 is a schematic diagram of a structure of a communication apparatus according to an embodiment of this application.

Based on the foregoing content and a same concept, this application provides a communication apparatus, configured to perform any solution of the terminal device in the foregoing method procedures. FIG. 13 is an example of a schematic diagram of a structure of a communication apparatus according to this application. For example, the communication apparatus 1300 in this example may be a terminal device, and may perform the solution correspondingly performed by the terminal device in FIG. 2. As shown in FIG. 13, the apparatus 1300 includes a processor 1301, a memory 1302, a transceiver 1303, an antenna 1304, and an input/output apparatus 1305. The processor 1301 is mainly configured to: process a communication protocol and communication data, control the communication apparatus, execute a software program, and process data of the software program, for example, is configured to support the communication apparatus in performing the actions described in the foregoing method embodiments. The memory 1302 is mainly configured to store a software program and data. The transceiver 1303 is mainly configured to: perform conversion between a baseband signal and a radio frequency signal, and process the radio frequency signal. The antenna 1304 is mainly configured to send and receive a radio frequency signal in a form of an electromagnetic wave. The input/output apparatus 1305, for example, a touchscreen, a display, or a keyboard, is mainly configured to receive data entered by a user and output data to the user.

The transceiver 1303 is configured to receive K reference signal resources, where K is an integer greater than 0.

The processor 1301 is configured to: determine S reference signal resources in the K reference signal resources, and determine first CSI of the S reference signal resources, where S is an integer greater than 0 and less than or equal to K.

The transceiver 1303 is configured to send a first random access preamble in a first random access time-frequency resource unit, where at least one of the first random access time-frequency resource unit and the first random access preamble is associated with the S reference signal resources, at least one of the first random access time-frequency resource unit and the first random access preamble is associated with the first CSI of the S reference signal resources, and S is an integer greater than 0 and less than or equal to K.

In a possible implementation, the processor 1301 is specifically configured to:

determine, based on a first association relationship and a second association relationship, the first random access time-frequency resource unit and the first random access preamble that are associated with the S reference signal resources and the first CSI, where the first association relationship is a quantity relationship among a random access time-frequency resource unit, a reference signal resource, a random access preamble, and a CSI value, and the second association relationship is used to indicate at least one of an order of associating CSI with a random access time-frequency resource unit and/or a random access preamble, and an order of associating a reference signal resource with a random access time-frequency resource unit and a random access preamble.

In a possible implementation, the first association relationship includes one or more of the following:

first information, where the first information is used to indicate a quantity Z of random access time-frequency resource units in a same time unit;

second information, where the second information is used to indicate a quantity Y of reference signal resources associated with one of the Z random access time-frequency resource units;

third information, where the third information is used to indicate a quantity X of random access preambles associated with one of the Y reference signal resources;

fourth information, where the fourth information is used to indicate a quantity L of random access preambles associated with any CSI value of one of the Y reference signal resources, and L is a positive integer; and fifth information, where the fifth information is used to indicate a quantity Q of CSI values of one of the Y reference signal resources, and Q is a positive integer, where Z is a positive integer less than or equal to R, R is a total quantity of random access time-frequency resource units, X and L are positive integers less than or equal to N, Y is a positive number less than or equal to K, and N is a total quantity of random access preambles.

In a possible implementation, the second information, the third information, and the fourth information meet the following constraint condition:

$X*1/Y \geq L*Q$, and $X*\max\{Y,1\} \leq N$, where $\max\{\ \}$ is an operation of obtaining a maximum value.

In a possible implementation, the third information, the fourth information, and the fifth information meet the following constraint condition:

$X = LQ$ or $X = \begin{cases} LQY, & Y \leq 1 \\ LQ, & Y > 1 \end{cases}$.

In a possible implementation, the K reference signal resources are associated with R random access time-frequency resource units, CSI of one of the K reference signal resources has Q values, and the K reference signal resources are associated with N random access preambles; and the second association relationship includes at least one of the following:

the K reference signal resources are successively associated with the R random access time-frequency resource units and the N random access preambles according to a first rule in ascending order of indexes of reference signal resources, where the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; and the K reference signal resources and Q values of CSI associated with each reference signal resource are successively associated with the N random access preambles and the R random access time-frequency resource units according to the first rule in a predefined order.

In a possible implementation, when the CSI includes a channel quality indicator CQI, in the predefined order, CQIs of one reference signal resource are first sorted in ascending order, and then indexes of reference signal resources are sorted in ascending order;

when the CSI includes a rank indicator RI and a channel quality indicator CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI includes a rank indicator RI and a channel quality indicator CQI, in the predefined order, CQIs corresponding to one RI of one reference signal resource are first sorted in ascending order, indexes of reference signal resources are further sorted in ascending order, and then RIs of the reference signal resource are sorted in ascending order.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A channel state information transmission method, comprising:
    receiving, by a terminal device, K reference signal resources, wherein K is an integer greater than 0;
    determining, by the terminal device, S reference signal resources in the K reference signal resources, wherein the S reference signal resources are determined based on received signal quality of the S reference signal resources, and wherein the S reference signal resources have a first channel state information (CSI) value that is determined based on at least one of a rank indicator (RI) value or a channel quality indicator (CQI) value of the S reference signal resources, wherein S is an integer greater than 0 and less than or equal to K; and
    sending, by the terminal device, a first random access preamble in a first random access time-frequency resource unit, wherein
    at least one of the first random access time-frequency resource unit or the first random access preamble is associated with the S reference signal resources, at least one of the first random access time-frequency resource unit or the first random access preamble is associated with the first CSI value of the S reference signal resources according to a second association relationship, wherein the second association relationship associates different CSI values to different random access time-frequency resource units or random access preambles.

2. The method according to claim 1, comprising:
    determining, by the terminal device, based on a first association relationship and the second association relationship, the first random access time-frequency resource unit and the first random access preamble that are associated with the S reference signal resources and the first CSI value; and
    the first association relationship is a relationship among a random access time-frequency resource unit, a reference signal resource, a random access preamble, and a CSI value.

3. The method according to claim 2, wherein the first association relationship comprises one or more of the following:
    first information, wherein the first information indicates a quantity Z of random access time-frequency resource units in a same time unit;
    second information, wherein the second information indicates a quantity Y of reference signal resources associated with one of the Z random access time-frequency resource units;
    third information, wherein the third information indicates a quantity X of random access preambles associated with one of the Y reference signal resources;
    fourth information, wherein the fourth information indicates a quantity L of random access preambles associated with any CSI value of one of the Y reference signal resources, and L is a positive integer; or
    fifth information, wherein the fifth information indicates a quantity Q of CSI values of one of the Y reference signal resources, and Q is a positive integer, wherein Z is a positive integer less than or equal to R, R is a total quantity of random access time-frequency resource units, X and L are positive integers less than or equal to N, Y is a positive number less than or equal to K, and N is a total quantity of random access preambles.

4. The method according to claim 3, wherein the second information, the third information, and the fourth information meet the following constraint condition:

$X*1/Y \geq L*Q$, and $X*\max\{Y,1\} \leq N$, wherein $\max\{\ \}$ is an operation of obtaining a maximum value.

5. The method according to claim 3, wherein the third information, the fourth information, and the fifth information meet the following constraint condition:

$X = LQ$ or $$X = \begin{cases} LQY, Y \leq 1 \\ LQ, Y > 1 \end{cases}.$$

6. The method according to claim 2, wherein at least a portion of information about the first association relationship is received in a system information block 1 (SIB 1).

7. The method according to claim 2, wherein the K reference signal resources are associated with R random access time-frequency resource units, CSI of one of the K reference signal resources has Q values, and the K reference signal resources are associated with N random access preambles; and
    the second association relationship comprises at least one of the following:
        the K reference signal resources are successively associated with the R random access time-frequency resource units or the N random access preambles according to a first rule in ascending order of indexes of reference signal resources, wherein the first rule is that association is performed first in ascending order of indexes of random access preambles associated with one random access time-frequency resource unit, further in ascending order of indexes of frequency domain resources occupied by the random access time-frequency resource unit, and then in ascending order of indexes of time domain resources occupied by the random access time-frequency resource unit; or the K reference signal resources and Q values of CSI associated with each reference signal resource are successively associated with the N random access preambles and the R random access time-frequency resource units according to the first rule in a predefined order.

8. The method according to claim 7, wherein at least one of the following occurs:

when the CSI comprises a channel quality indicator (CQI) in the predefined order, CQIs of one reference signal resource are first sorted in ascending order, and then indexes of reference signal resources are sorted in ascending order;

when the CSI comprises a rank indicator (RI) and a CQI, in the predefined order, CQIs corresponding to one RI of one reference signal resource are first sorted in ascending order, RIs of the reference signal resource are further sorted in ascending order, and then indexes of reference signal resources are sorted in ascending order; or when the CSI comprises a RI and a CQI, in the predefined order, CQIs corresponding to one RI of one reference signal resource are first sorted in ascending order, indexes of reference signal resources are further sorted in ascending order, and then RIs of the reference signal resource are sorted in ascending order.

9. A channel state information transmission apparatus, comprising:
a transceiver;
at least one processor; and
one or more memories coupled to the at least one processor and storing programming instructions for execution by the at least one processor to cause the apparatus to:
send, by using the transceiver, K reference signal resources, wherein K is an integer greater than 0;
receive, by using the transceiver, a first random access preamble in a first random access time-frequency resource unit; and
determine indexes of S reference signal resources and first channel state information (CSI) value of the S reference signal resources based on the first random access preamble and the first random access time-frequency resource unit, the first CSI value indicates received signal quality of the S reference signal resources, wherein
the S reference signal resources are associated with at least one of the first random access time-frequency resource unit or the first random access preamble, the first CSI value is associated with at least one of the first random access time-frequency resource unit or the first random access preamble according to a second association relationship, wherein the second association relationship associates different CSI values to different random access time-frequency resource units or random access preambles, the S reference signal resources are reference signal resources in the K reference signal resources, and S is an integer greater than 0 and less than or equal to K.

10. The apparatus according to claim 9, wherein the programming instructions, when executed by the at least one processor, cause the apparatus to:
determine, based on a first association relationship and the second association relationship, the S reference signal resources and the first CSI value that are associated with the first random access time-frequency resource unit and the first random access preamble, wherein
the first association relationship is a relationship among a random access time-frequency resource unit, a reference signal resource, a random access preamble, and a CSI value.

11. The apparatus according to claim 10, wherein the first association relationship comprises one or more of the following:
first information, wherein the first information indicates a quantity Z of random access time-frequency resource units in a same time unit;
second information, wherein the second information indicates a quantity Y of reference signal resources associated with one of the Z random access time-frequency resource units;
third information, wherein the third information indicates a quantity X of random access preambles associated with one of the Y reference signal resources;
fourth information, wherein the fourth information indicates a quantity L of random access preambles associated with any CSI value of one of the Y reference signal resources, and L is a positive integer; and
fifth information, wherein the fifth information indicates a quantity Q of CSI values of one of the Y reference signal resources, and Q is a positive integer, wherein
Z is a positive integer less than or equal to R, R is a total quantity of random access time-frequency resource units, X and L are positive integers less than or equal to N, Y is a positive number less than or equal to K, and N is a total quantity of random access preambles.

12. The apparatus according to claim 11, wherein the second information, the third information, and the fourth information meet the following constraint condition:

$X*1/Y \geq L*Q$, and $X*\max\{Y,1\} \leq N$, wherein max{ } is an operation of obtaining a maximum value.

13. The apparatus according to claim 11, wherein the third information, the fourth information, and the fifth information meet the following constraint condition:

$$X = LQ \text{ or }$$
$$X = \begin{cases} LQY, Y \leq 1 \\ LQ, Y > 1 \end{cases}.$$

14. The apparatus according to claim 10, wherein the programming instructions, when executed by the at least one processor, cause the apparatus to transmit at least a portion of information about the first association relationship in a system information block 1 (SIB 1).

15. A channel state information transmission apparatus, comprising:
a transceiver;
at least one processor; and
one or more memories coupled to the at least one processor and storing programming instructions for execution by the at least one processor to cause the apparatus to:
receive, by using the transceiver, K reference signal resources, wherein K is an integer greater than 0;
determine S reference signal resources in the K reference signal resources, wherein the S reference signal resources are determined based on received signal quality of the S reference signal resources, and wherein the S reference signal resources have a first channel state information (CSI) value that is determined based on at least one of a rank indicator (RI) value or a channel quality indicator (CQI) value of the S reference signal resources, wherein S is an integer greater than 0 and less than or equal to K; and send, by using the transceiver, a first random access preamble in a first random access time-frequency resource unit, wherein at least one of the first random access time-frequency resource unit or the first random access preamble is associated with the S reference signal resources, at least one of the first random access time-frequency resource unit or the first random access preamble is associated with the first CSI value of the S reference signal resources according to a second association relationship, wherein the second association relationship associates different CSI values to different random access time-frequency resource units or random access preambles.

16. The apparatus according to claim 15, wherein the programming instructions, when executed by the at least one processor, cause the apparatus to:

determine, based on a first association relationship and the second association relationship, the first random access time-frequency resource unit and the first random access preamble that are associated with the S reference signal resources and the first CSI value, wherein the first association relationship is a relationship among a random access time-frequency resource unit, a reference signal resource, a random access preamble, and a CSI value.

17. The apparatus according to claim 16, wherein the first association relationship comprises one or more of the following:

first information, wherein the first information indicates a quantity Z of random access time-frequency resource units in a same time unit;

second information, wherein the second information indicates a quantity Y of reference signal resources associated with one of the Z random access time-frequency resource units;

third information, wherein the third information indicates a quantity X of random access preambles associated with one of the Y reference signal resources;

fourth information, wherein the fourth information indicates a quantity L of random access preambles associated with any CSI value of one of the Y reference signal resources, and L is a positive integer; and fifth information, wherein the fifth information indicates a quantity Q of CSI values of one of the Y reference signal resources, and Q is a positive integer, wherein Z is a positive integer less than or equal to R, R is a total quantity of random access time-frequency resource units, X and L are positive integers less than or equal to N, Y is a positive number less than or equal to K, and N is a total quantity of random access preambles.

18. The apparatus according to claim 17, wherein the second information, the third information, and the fourth information meet the following constraint condition:

$X*1/Y \geq L*Q$, and $X*\max\{Y,1\} \leq N$, wherein $\max\{\ \}$ is an operation of obtaining a maximum value.

19. The apparatus according to claim 17, wherein the third information, the fourth information, and the fifth information meet the following constraint condition:

$$X = LQ \text{ or}$$
$$X = \begin{cases} LQY, & Y \leq 1 \\ LQ, & Y > 1 \end{cases}.$$

20. The apparatus according to claim 17, wherein at least a portion of information about the first association relationship is received in a system information block 1 (SIB 1).

* * * * *